(12) United States Patent
Kwak et al.

(10) Patent No.: US 10,454,555 B2
(45) Date of Patent: Oct. 22, 2019

(54) CHANNEL STATE INFORMATION FEEDBACK METHOD AND APPARATUS FOR 2-DIMENSIONAL MASSIVE MIMO COMMUNICATION SYSTEM

(71) Applicant: Samsung Electronics Co., Ltd., Suwon-si, Gyeonggi-do (KR)

(72) Inventors: Youngwoo Kwak, Suwon-si (KR); Hyojin Lee, Suwon-si (KR); Hyoungju Ji, Seoul (KR); Younsun Kim, Seongnam-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 14/717,457

(22) Filed: May 20, 2015

(65) Prior Publication Data

US 2015/0341100 A1   Nov. 26, 2015

(30) Foreign Application Priority Data

May 23, 2014   (KR) .................. 10-2014-0062603

(51) Int. Cl.
*H04B 7/06* (2006.01)
*H04L 25/02* (2006.01)
(Continued)

(52) U.S. Cl.
CPC ......... *H04B 7/0626* (2013.01); *H04B 7/0413* (2013.01); *H04L 5/0048* (2013.01);
(Continued)

(58) Field of Classification Search
None
See application file for complete search history.

(56) References Cited

U.S. PATENT DOCUMENTS 3,699,463 A * 10/1972 Stone ................... G02F 1/0121
                                                          329/300
9,813,867 B2 * 11/2017 Prevatt ................. H04W 4/023
(Continued)

FOREIGN PATENT DOCUMENTS

KR   10-2014-0057005 A   5/2014
KR   10-2015-0070925 A   6/2015
(Continued)

OTHER PUBLICATIONS

Alcatel-Lucent Shanghai Bell et al.; Considerations on CSI feedback enhancements for high-priority antenna configurations; 3GPP TSG-RAN WG1 #66; R1-112420; Aug. 22-26, 2011; Athens, Greece.
(Continued)

*Primary Examiner* — Steve R Young
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A channel state information feedback method and apparatus of a terminal (1200) is provided for measuring channel quality and reporting the measurement result to a base station (1300) in the mobile communication system supporting multi-carrier multiple access scheme such as Orthogonal Frequency Division Multiple Access (OFDMA). A feedback method of a terminal (1200) in a mobile communication system includes acquiring reference antenna port information for at least one Reference Signal (RS), receiving the at least one Reference Signal (RS) from a base
(Continued)

station (1300), estimating at least one channel carrying the at least one Reference Signal (RS), and transmitting feedback information on at least one estimated channel to the base station (1200).

20 Claims, 13 Drawing Sheets

(51) Int. Cl.
*H04B 7/04* (2017.01)
*H04L 5/00* (2006.01)
*H04B 7/0413* (2017.01)
*H04L 25/03* (2006.01)
*H04B 7/0456* (2017.01)

(52) U.S. Cl.
CPC .... *H04L 25/0224* (2013.01); *H04L 25/03898* (2013.01); *H04B 7/0478* (2013.01); *H04B 7/063* (2013.01); *H04B 7/0639* (2013.01)

(56) References Cited

U.S. PATENT DOCUMENTS

| | | | |
|---|---|---|---|
| 2010/0173660 A1 | 7/2010 | Liu et al. | |
| 2012/0207195 A1* | 8/2012 | Kawasaki | H04B 1/04 375/219 |
| 2013/0258894 A1 | 10/2013 | Ogawa et al. | |
| 2014/0029684 A1* | 1/2014 | Shirani-Mehr | H04B 7/0469 375/267 |
| 2014/0079146 A1 | 3/2014 | Kim et al. | |
| 2014/0126436 A1 | 5/2014 | Safavi et al. | |
| 2014/0192762 A1* | 7/2014 | Li | H04L 25/03929 370/329 |
| 2014/0349587 A1 | 11/2014 | Frenger et al. | |
| 2015/0124736 A1* | 5/2015 | Ko | H04B 7/0626 370/329 |
| 2015/0133173 A1* | 5/2015 | Edge | G01S 1/66 455/456.6 |
| 2015/0288497 A1* | 10/2015 | Li | H04B 7/0413 370/329 |
| 2015/0341091 A1* | 11/2015 | Park | H04B 7/0456 375/267 |
| 2016/0173176 A1* | 6/2016 | Mizusawa | H04B 7/0456 375/267 |
| 2017/0005764 A1* | 1/2017 | Park | H04B 7/26 |
| 2017/0070276 A1* | 3/2017 | Kim | H04B 7/0413 |

FOREIGN PATENT DOCUMENTS

| | | |
|---|---|---|
| WO | 2013/024350 A2 | 2/2013 |
| WO | 2013/119159 A1 | 8/2013 |
| WO | 2014/161145 A1 | 10/2014 |

OTHER PUBLICATIONS

ITRI; Feedback Enhancement for 2D Antenna Array; 3GPP TSG RAN WG1 Meeting #80; R1-150423; Feb. 9-13, 2015; Athens, Greece.

* cited by examiner

CHANNEL STATE INFORMATION FEEDBACK METHOD AND APPARATUS FOR 2-DIMENSIONAL MASSIVE MIMO COMMUNICATION SYSTEM

TECHNICAL FIELD

The present invention relates to a mobile communication system and, in particular, a channel state information feedback method and apparatus of a terminal for measuring channel quality and reporting the measurement result to a base station in the mobile communication system supporting multi-carrier multiple access scheme such as Orthogonal Frequency Division Multiple Access (OFDMA).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The mobile communication system has evolved into a high-speed, high-quality wireless packet data communication system to provide data and multimedia services beyond the early voice-oriented services. In line with this tendency, the standardization organizations such as $3^{rd}$ Generation Partnership Project (3GPP), 3GPP2, and Institute of Electrical and Electronics Engineers (IEEE) are standardizing 3G evolved mobile communication standards based on multicarrier multiple access scheme. The 3GPP Long Term Evolution (LTE), 3GPP2 Ultra Mobile Broadband (UMB), and IEEE 802.16m are the mobile communication standards that have been developed to support high speed high quality wireless packet data communication services based on the multicarrier multiple access scheme.

Existing 3G evolved mobile communication standards such as LTE, UMB, and IEEE 802.16m based on the multicarrier multiple access scheme are characterized by various techniques including Multiple Input Multiple Output (MIMO), beamforming, Adaptive Modulation and Coding (AMC), channel sensitive scheduling, etc. for improving transmission efficiency. Such techniques are capable of concentrating transmission power with multiple antennas or adjusting transmission data amount depending on the channel quality and transmitting data to the user with good channel quality selectively, resulting in improvement of transmission efficiency and increase of system throughput.

Because most of these techniques operate based on the channel state information between an evolved Node B (eNB) (or Base Station (BS)) and a User Equipment (UE) (or Mobile Station (MS)), the eNB or UE has to measure the channel state between the eNB and UE based on Channel State Indication Reference Signal (CSI-RS). The eNB is a transmitter in downlink and a receiver in uplink and capable of managing a plurality cells for communication. A mobile communication system is made up of a plurality of eNBs distributed geographically, and each eNB manages a plurality of cells to provide the UEs with communication service.

Existing 3G and 4G mobile communication systems represented by LTE/LTE-A adopt MIMO techniques using a plurality of transmission/receive antennas to increase data rate and system throughput. Using a MIMO scheme, it is possible to transmit a plurality of information streams separated spatially. This technique of transmitting the plural information streams is referred to as spatial multiplexing. Typically, the number of information streams to be spatially multiplexed is determined depending on the numbers of antennas of the transmitter and receiver. The number of information streams that can be spatially multiplexed is referred to as rank of the corresponding transmission. The LTE/LTE-A Release 11 supports 8×8 MIMO spatial multiplexing and up to rank 8.

The Full Dimension MIMO (FD-MIMO) system equipped with the technology proposed in the present invention is capable of utilizing 32 or more transmit antennas as compared to the legacy LTE/LTE-A MIMO technology supporting up to 8 antennas.

In the present invention, the FD-MIMO system denotes a wireless communication system capable of transmitting data using a few dozen or more of transmit antennas.

There is therefore a need for a method for a terminal to measure the channels between the base station and the terminal with low overhead and report the channel state information generated based on the measurement result to the base station efficiently.

SUMMARY

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

The present invention has been conceived to solve the above problems and aims to provide a method and apparatus for generating channel state information that is capable of allowing the terminal to measure the reference signal and transmit the channel state information for efficient data communication in the LTE-A system operating based on the FD-MIMO-based LTE-A system. In order to accomplish this, the base station transmits reference signal location and virtualization parameters to the terminal. Also, the present invention provides a method and apparatus for the base station to transmit the reference signal to the terminal and receive the channel state information transmitted by the terminal.

In accordance with an aspect of the present invention, a feedback method of a terminal in a mobile communication system is provided. The feedback method includes acquiring reference antenna port information for at least one Reference Signal (RS), receiving the at least one RS from a base station, estimating channels carrying the at least one RS, and transmitting feedback information on the estimated channel to the base station.

In accordance with another aspect of the present invention, a terminal for transmitting feedback information in a mobile communication system is provided. The terminal includes a communication unit which is responsible for data communication and a control unit which controls acquiring reference antenna port information for at least one Reference Signal (RS), receiving the at least one RS from a base station, estimating channels carrying the at least one RS, and transmitting feedback information on the estimated channel to the base station.

In accordance with another aspect of the present invention, a feedback reception method of a base station in a mobile communication system is provided. The feedback reception method includes transmitting at least one Reference Signal (RS) to a terminal and receiving feedback information on the channel carrying the RS from the terminal, wherein the feedback information is information on the channel estimated based on a reference antenna port information for the RS acquired by the terminal.

In accordance with still another aspect of the present invention, a base station for receiving feedback from a terminal in a mobile communication system is provided. The base station includes a communication unit which is responsible for data communication and a control unit which controls the communication unit to transmit at least one Reference Signal (RS) to a terminal and receive feedback information on the channel carrying the RS from the terminal, wherein the feedback information is information on the channel estimated based on a reference antenna port information for the RS acquired by the terminal.

The at least one reference signal (RS) may be a horizontal and vertical direction RS for a plurality antennas arranges 2-dimensionally.

The reference antenna port information may be information on the antenna port of the base station which transmitting the at least one RS.

Regarding the terminal at least one RS may be transmitted through at least one logical antenna port.

Regarding the terminal the at least one RS may be a horizontal and vertical direction RS for a plurality antennas arranges 2-dimensionally.

Regarding the terminal the reference antenna port information may be information on the antenna port of the base station which transmitting the at least one RS.

The control unit may acquire the reference antenna port information through one of a predetermined rule, a Radio Resource Control (RRC) signaling, and Layer 1 (L1) signaling between the base station and the terminal.

The control unit may control receiving a parameter indicating relationship between the at least one RS with the reference antenna port information and estimating channels carrying the RS based on the parameter.

Regarding the feedback reception method of a base station at least one RS may be transmitted through at least one logical antenna port.

Regarding the feedback reception method of a base station the at least one RS may be a horizontal and vertical direction RS for a plurality antennas arranges 2-dimensionally.

Regarding the feedback reception method of a base station the reference antenna port information may be information on the antenna port of the base station which transmitting the at least one RS.

Regarding the feedback reception method of a base station the reference antenna port information may be acquired through one of a predetermined rule, a Radio Resource Control (RRC) signaling, and Layer 1 (L1) signaling between the base station and the terminal.

Regarding the base station at least one RS may be transmitted through at least one logical antenna port.

Regarding the base station the at least one RS may be a horizontal and vertical direction RS for a plurality antennas arranges 2-dimensionally.

Regarding the base station the reference antenna port information may be information on the antenna port of the base station which transmitting the at least one RS.

Regarding the base station the reference antenna port information may be acquired through one of a predetermined rule, a Radio Resource Control (RRC) signaling, and Layer 1 (L1) signaling between the base station and the terminal.

DETAILED DESCRIPTION

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

The terms used in the following description are provided to help understanding the present invention and may be modified into different forms without departing from the scope of the present invention. Therefore, the definition should be made on the basis of the overall content of the present specification.

Although the description is directed to the OFDM-based radio communication system, particularly the 3GPP EUTRA, it will be understood by those skilled in the art that the present invention can be applied even to other communication systems having the similar technical background and channel format, with a slight modification, without departing from the scope of the present invention.

Figure 1:
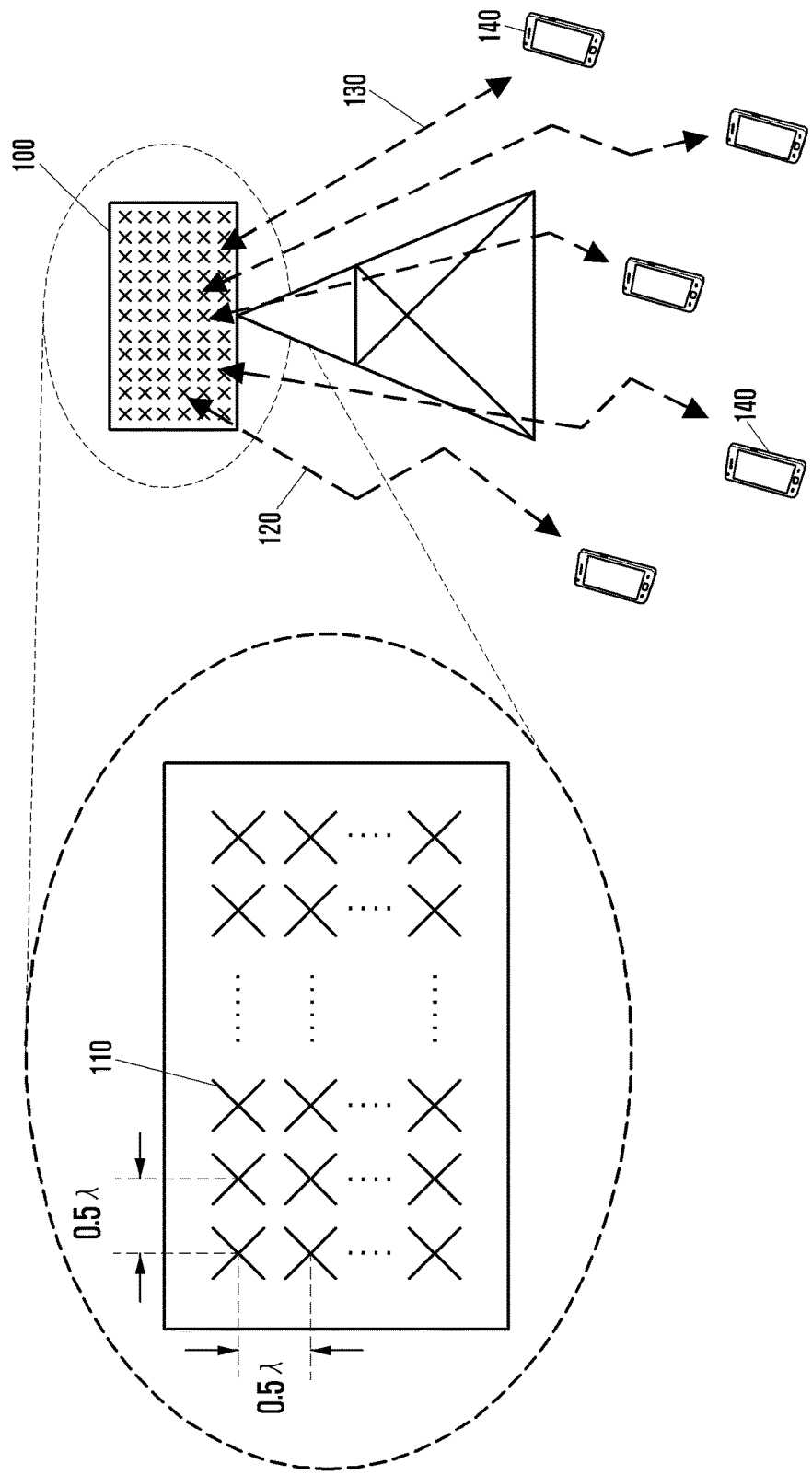
FIG. 1 is a diagram illustrating a FD-MIMO system.

FIG. 1 is a diagram illustrating a FD-MIMO system.

Referring to FIG. 1, the base station transmitter 100 transmits radio signals 120 and 130 through a few dozen or more transmit antennas 110. The transmit antennas 110 are arranged at minimum distance among each other. The minimum distance may be half of the wavelength (λ/2) of the radio signal. Typically, in the case that the transmit antennas are arranged at the distance of half of the wavelength of the radio signal, the signals transmitted by the respective transmit antennas are influenced by radio channel with low correlation. Assuming the radio signal band of 2 GH, this distance is 7.5 cm and shortened as the band becomes higher than 2 GHz.

In FIG. 1, a few dozen or more transmit antennas 110 arranged at the base station 100 are used to transmit signals as denoted by reference numbers 120 and 130 to one or more terminals 140. In order to transmit signals to plural terminals 140 simultaneously, an appropriated precoding is applied. At this time, one terminal 140 may receive plural information streams. Typically, a number of information streams which a terminal 140 can receive is determined depending on the number of receive antenna of the terminal 140, channel state, and reception capability of the terminal 140.

In spatial multiplexing, precoding means to apply linear processing to the modulation symbols before OFDM modulation. The precoding can be used to orthogonalize the parallel signals at the transmitter such that the receiver can discriminates among the signals efficiently in the case where the number of the signals to be spatially multiplexed is identical with the number of the transmit antennas 110. In the case that the number of signals to be spatially multiplexed is less than the number of the transmit antennas 110, the precoding can be applied such that the spatially multiplexed signals are mapped to the transmit antennas 110 in combination with the spatial multiplexing and beamforming.

In FIG. 1, a terminal 140 can receive one or more information streams. Typically, the number of information streams that one terminal 140 can receive is determined from the number of receive antennas of the terminal 140 and a channel condition.

In order to implement the FD-MIMO system efficiently, the terminal 140 has to measure the channel condition and interference size accurately and transmit the channel state information to the base station 100 efficiently. If the channel state information is received, the base station 100 determines the terminals 140 for downlink transmission, downlink data rate, and precoding to be applied. In the case of FD-MIMO system using large number of transmit antennas, if the channel state information transmission method of the legacy LTE/LTE-A system is applied without modification, the control information amount to be transmitted in uplink increases significantly, resulting in uplink overhead.

The mobile communication system is restricted in resource such as time, frequency, and transmission power. Accordingly, if the resource allocated for reference signal increases, the resource amount to be allocated for data traffic channel transmission decreases, resulting in reduction of absolute data transmission amount. In this case, although the channel estimation and measurement performance are improved, the data transmission amount decreases, resulting in reduction of entire system throughput.

Thus, there is a need of allocating the resources for reference signal and traffic channel transmissions efficiently in order to maximize the entire system throughput.

Figure 2:
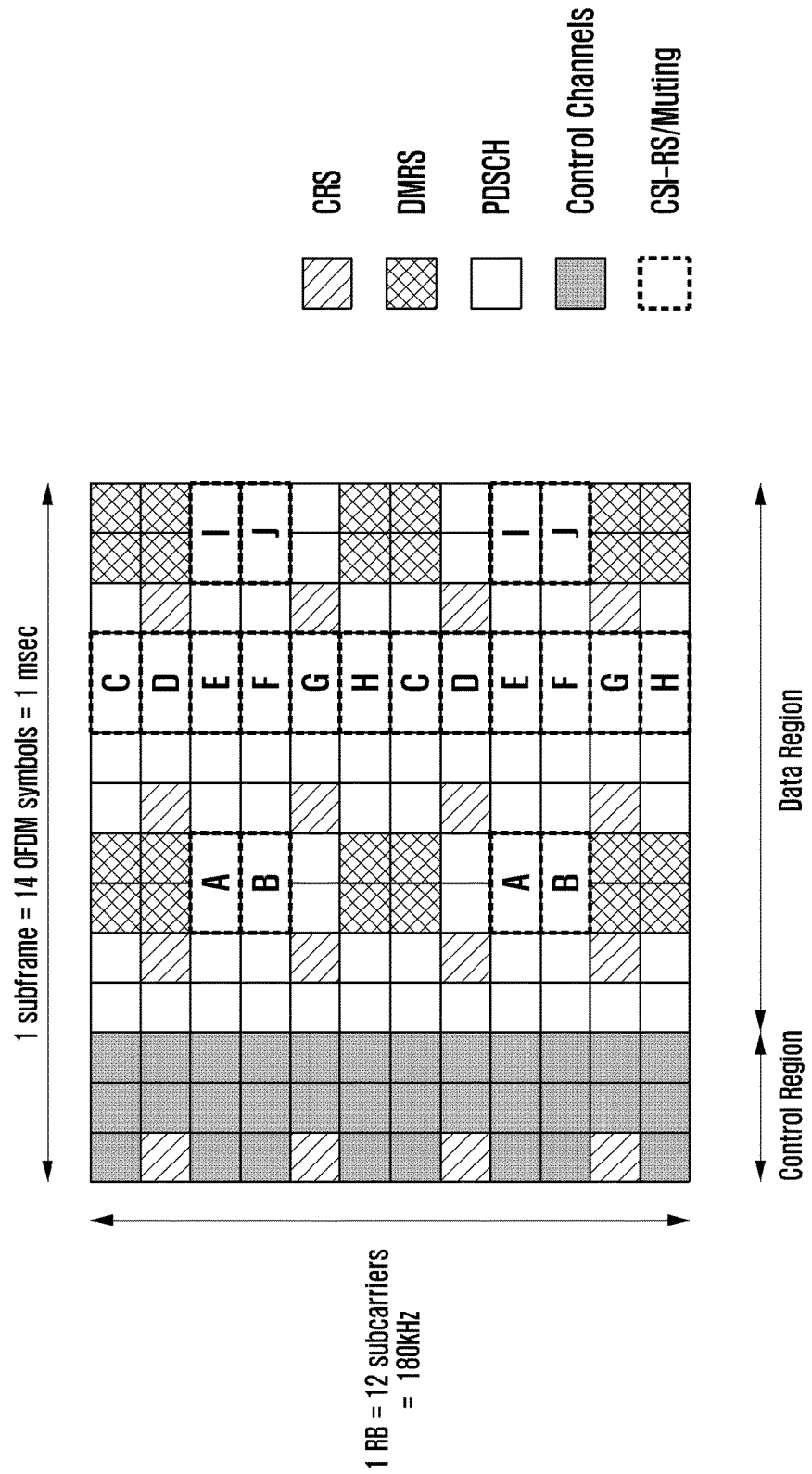
FIG. 2 is a time-frequency grid illustrating a single Resource Block (RB) of a downlink subframe as a smallest scheduling unit in the LTE/LTE-A system.

FIG. 2 is a time-frequency grid illustrating a single Resource Block (RB) of a downlink subframe as a smallest scheduling unit in the LTE/LTE-A system.

As shown in FIG. 2, the radio resource is of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE).

The radio resource structured as shown in FIG. 2 can be used for transmitting plural different types of signals as follows.

CRS (Cell-specific Reference Signal): reference signal transmitted to all the UEs within a cell;

DMRS (Demodulation Reference Signal): reference signal transmitted to a specific UE;

PDSCH (Physical Downlink Shared Channel): data channel transmitted in downlink which the eNB use to transmit data to the UE and mapped to REs not used for reference signal transmission in data region of FIG. 2; and CSI-RS (Channel state information Reference Signal): reference signal transmitted to the UEs within a cell and used for channel state measurement. Multiple CSI-RSs can be transmitted within a cell.

Other control channels (PHICH (Physical Hybrid-ARQ (Automatic Repeat Request) Indicator Channel), PCFICH (Physical Control Format Indicator Channel), PDCCH (Physical Downlink Control Channel)): channels for providing control channel necessary for the UE to receive PDCCH and transmitting ACK/NACK of HARQ (Hybrid-ARQ) operation for uplink data transmission.

In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS, and the UE receives the traffic signal skipping the corresponding radio resource in general. In the LTE-A system, the zero power CSI-RS is referred to as muting. The zero power CSI-RS (muting) is mapped to the CSI-RS position without transmission power allocation.

In FIG. 2, the CSI-RS can be transmitted at some of the positions marked by A, B, C, D, E, F, G, H, I, and J according to the number of antennas transmitting CSI-RS. Also, the zero power CSI-RS (muting) can be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, entire of the specific pattern is used for CSI-RS transmission; and for eight antenna ports, two patterns are used for CSI-RS transmission. Meanwhile, muting is always performed by pattern. That is, although the muting may be applied to plural patterns, if the muting positions mismatch CSI-RS positions, it cannot be applied to one pattern partially.

In the case of transmitting CSI-RSs of two antenna ports, the CSI-RSs are mapped to two consecutive REs in the time domain and distinguished from each other using orthogonal codes. In the case of transmitting CSI-RSs of four antenna ports, the CSI-RSs are mapped in the same way of mapping the two more CSI-RSs to two more consecutive REs. This is applied to the case of transmitting CSI-RSs of eight antenna ports.

In a cellular system, the reference signal has to be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition.

For example, in the case that the eNB with one transmit antenna transmits the reference signal to the UE with one receive antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In the LTE-A (LTE-Advanced) system, the UE feeds back the information on the downlink channel state for use in downlink scheduling of the eNB. That is, the UE measures the reference signal transmitted by the eNB in downlink and feeds back the information estimated from the reference signal to the eNB in the format defined in LTE/LTE-A standard. In LTE/LTE-A, the UE feedback information includes the following three indicators:

Rank Indicator (RI): number of spatial layers that can be supported by the current channel experienced at the UE.

Precoding Matrix Indicator (PMI): precoding matrix recommended by the current channel experienced at the UE.

Channel Quality Indicator (CQI): maximum possible data rate at which the UE can receive a signal in the current channel state. CQI may be replaced with the SINR, maximum error correction code rate and modulation scheme, or per-frequency data efficiency that can be used in similar way to the maximum data rate.

The RI, PMI, and CQI are associated among each other in meaning. For example, the precoding matrix supported in LTE/LTE-A is configured differently per rank. Accordingly, the PMI value 'X' is interpreted differently for the cases of RI set to 1 and RI set to 2. Also, when determining CQI, the UE assumes that the PMI and RI which it has reported are applied by the eNB. That is, if the UE reports RI_X, PMI_Y, and CQI_Z; this means that the UE is capable of receiving the signal at the data rate corresponding to CQI_Z when the rank RI_X and the precoding matrix PMI_Y are applied. In this way, the UE calculates CQI with which the optimal performance is achieved in real transmission under the assumption of the transmission mode to be selected by the eNB.

In LTE/LTE-A, the UE is configured with one of the following four feedback or reporting modes depending on the information to be included therein:

Reporting Mode 1-0: RI, wideband CQI (wCQI);
Reporting Mode 1-1: RI, wCQI, wideband PMI (wPMI);
Reporting Mode 2-0: RI, wCQI, subband CQI (sCQI);
Reporting Mode 2-1: RI, wCQI, wPMI, sCQI, sPMI.

The feedback timing in the respective feedback mode is determined based on $I_{CQI/PMI}$ transmitted through high layer signaling and $N_{pd}$, $N_{OFFSET,CQI}$, $M_{RI}$, $N_{OFFSET,RI}$ corresponding to $I_{RI}$. In Mode 1-0, the wCQI transmission period is $N_{pd}$, and the feedback timing is determined based on the subframe offset value of $N_{OFFSET,CQI}$. The RI transmission period is $N_{pd} \cdot M_{RI}$, and RI transmission period offset is $N_{OFFSET,CQI} + N_{OFFSET,RI}$.

Figure 3:
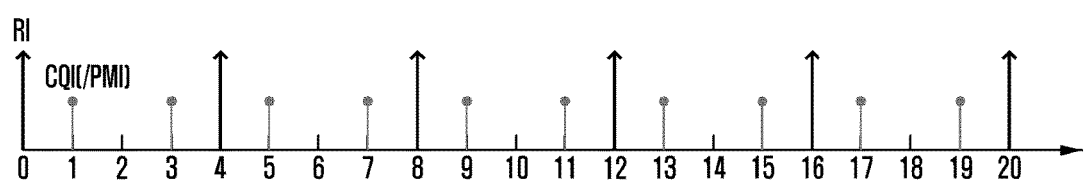
FIG. 3 is a diagram illustrating feedback timings of RI and wCQI according to an embodiment of the present invention.

FIG. 3 is a diagram illustrating feedback timings of RI and wCQI in the case of $N_{pd}=2$, $M_{RI}=2$, $N_{OFFSET,CQI}=1$, and $N_{OFFSET,RI}=-1$. Here, the respective timing is indicated by the subframe index.

Here, the feedback mode 1-1 has the same timings as the feedback mode 1-0 with the exception that PMI is transmitted at the wCQI transmission timing together.

In the feedback mode 2-0, the sCQI feedback period is $N_{pd}$ with offset $N_{OFFSET,CQI}$. The wCQI feedback period is $H \cdot N_{pd}$ with offset $N_{OFFSET,CQI}$ equal to the sCQI offset. Here, $H=J \cdot K+1$ where K is transmitted through higher layer signal and J is determined according to the system bandwidth.

For example, J is determined as 3 in the 10 MHz system. This means that wCQI is transmitted at every H sCQI transmissions in replacement of sCQI. The RI period $M_{RI} \cdot H \cdot N_{pd}$ with offset $N_{OFFSET,CQI} + N_{OFFSET,RI}$.

Figure 4:
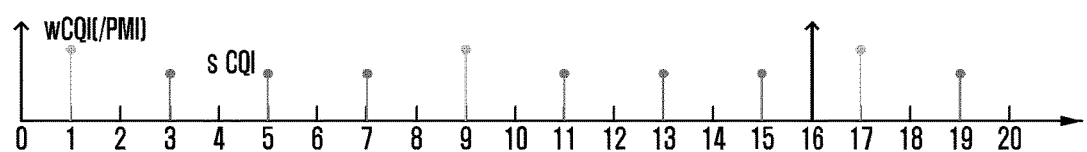
FIG. 4 is a diagram illustrating feedback timings of RI, sCQI, and wCQI according to an embodiment of the present invention.

FIG. 4 is a diagram illustrating feedback timings of RI, sCQI, and wCQI in the case of $N_{pd}=2$, $M_{RI}=2$, J=3 (10 MHz), K=1, $N_{OFFSET,CQI}=1$, and $N_{OFFSET,RI}=-1$. The feedback mode 2-1 is identical with the feedback mode 2-0 in feedback timings with the exception that PMI is transmitted at the wCQI transmission timings together.

Unlike the feedback timings for the case of 4 CSI-RS antenna ports as described above, two PMIs have to be transmitted for 8 CSI-RS antenna ports. For 8 CSI-RS antenna ports, the feedback mode 1-1 is divided into two sub-modes. In the first sub-mode, the first PMI is transmitted along with RI and the second PMI along with wCQI. Here, the wCQI and second PMI feedback period and offset are defined as $N_{pd}$ and $N_{OFFSET,CQI}$, and the RI and first PMI feedback period and offset are defined as $M_{RI} \cdot N_{pd}$ and $N_{OFFSET,CQI}+N_{OFFSET,RI}$, respectively. If the precoding matrix indicated by the first PMI is W1 and the precoding matrix indicated by the second PMI is W2, the UE and the eNB share the information on the UE-preferred precoding matrix of W1W2.

For the 8 CSI-RS antenna ports, the feedback mode 2-1 adopts new information of Precoding Type Indicator (PTI) which is transmitted along with RI at period of $M_{RI} \cdot H \cdot N_{pd}$ with the offset of $N_{OFFSET,CQI}+N_{OFFSET,RI}$.

For PTI=0, the first and second PMIs and wCQI are transmitted, particularly the wCQI and second PMI at the same timing at a period $N_{pd}$ with an offset of $N_{OFFSET,CQI}$. Meanwhile, the first PMI is transmitted at a period of $H' \cdot N_{pd}$ with an offset of $N_{OFFSET,CQI}$. Here, H' is transmitted through higher layer signaling.

For PTI=1, the PTI and RI are transmitted at the same timing, the wCQI and second PMI are transmitted at the same timing, and sCQI is transmitted additionally. In this case, the first PMI is not transmitted. The PTI and RI are transmitted at the same period with the same offset as the case of PTI=0, and sCQI is transmitted at a period of $N_{pd}$ with an offset of $N_{OFFSET,CQI}$. Also, the wCQI and second PMI are transmitted at a period of $H \cdot N_{pd}$ with an offset of $N_{OFFSET,CQI}$, and H is set to the same value as the case of 4 CSI-RS antenna ports.

Figure 5:
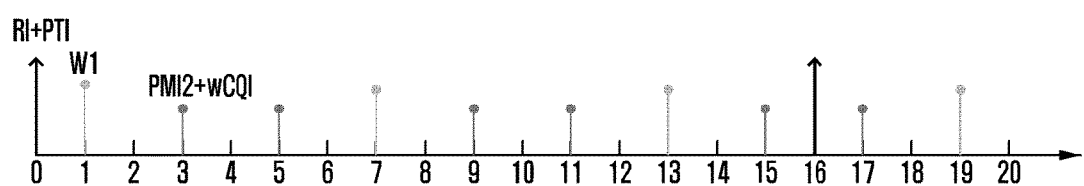
FIG. 5 is a diagram illustrating feedback timings in case of PTI=0 according to an embodiment of the present invention.

FIG. 5 is a diagram illustrating feedback timings for PTI=0 with $N_{pd}=2$, $M_{RI}=2$, J=3 (10 MHz), K=1, H'=3, $N_{OFFSET,CQI}=1$, and $N_{OFFSET,RI}=-1$.

Figure 6:
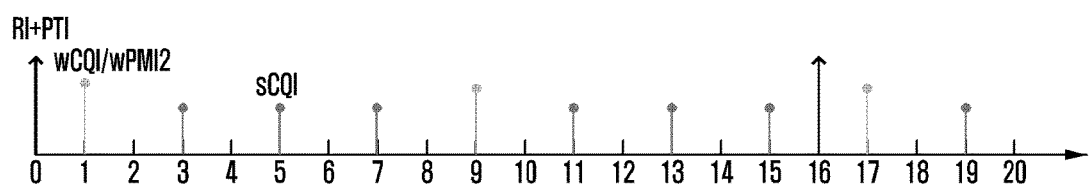
FIG. 6 is a diagram illustrating feedback timings in case of PTI=1 according to an embodiment of the present invention.

FIG. 6 is a diagram illustrating feedback timings for PTI=1 with $N_{pd}=2$, $M_{RI}=2$, J=3 (10 MHz), K=1, H'=3, $N_{OFFSET,CQI}=1$, and $N_{OFFSET,RI}=-1$.

Typically, in the FD-MIMO using a plurality of transmit antennas, the number of CSI-RSs has to increase in proportion to the number of transmit antennas. In an exemplary case of LTE/LTE-A using 8 transmit antennas, the eNB has to transmit CSI-RSs of 8 ports to the UE for downlink channel state measurement. At this time, in order to transmit 8-port CSI-RSs, 8 REs have to be allocated for CSI-RS transmission in one RB as marked by A and B in FIG. 2. In the case of applying CSI-RS transmission scheme of LTE/LTE-A to FD-MIMO, the CSI-RS transmission resource increases in proportion to the number of transmit antennas. That is, the eNB having 128 transmit antennas has to transmit CSI-RS on 128 REs in one RB. Such a CSI-RS transmission scheme consumes excessive radio resources and thus causes shortage of resource for data transmission.

In order to make it possible for the UE to measure the channels of the plural transmit antennas while preventing the eNB having a plurality of transmit antennas like FD-MIMO from allocating excessively large amounts of radio resource for CSI-RS transmission, it can be configured to transmit CSI-RSs in N dimensions. In an exemplary case that the transmit antennas of the eNB is arranged in 2 dimensions as shown in FIG. 2, it is possible to transmit CSI-RSs in 2 dimensions separately.

According to this principle, the reference signals transmitted from the eNB to the UE may be classified into the first CSI-RS and second CSI-RS. According to an embodiment of the present invention, the two types of reference signals may be differentiated between horizontal direction and vertical direction such that one CSI-RS is used for horizontal direction channel information (horizontal CSI-RS) and the other for vertical direction channel information (vertical CSI-RS). Although it is not mandatory to classify the reference signals into the horizontal and vertical components for implementing the present invention, the description is made under the assumption that the reference signals are classified into horizontal CSI-RS and vertical CSI-RS for simplifying the explanation.

Figure 7:
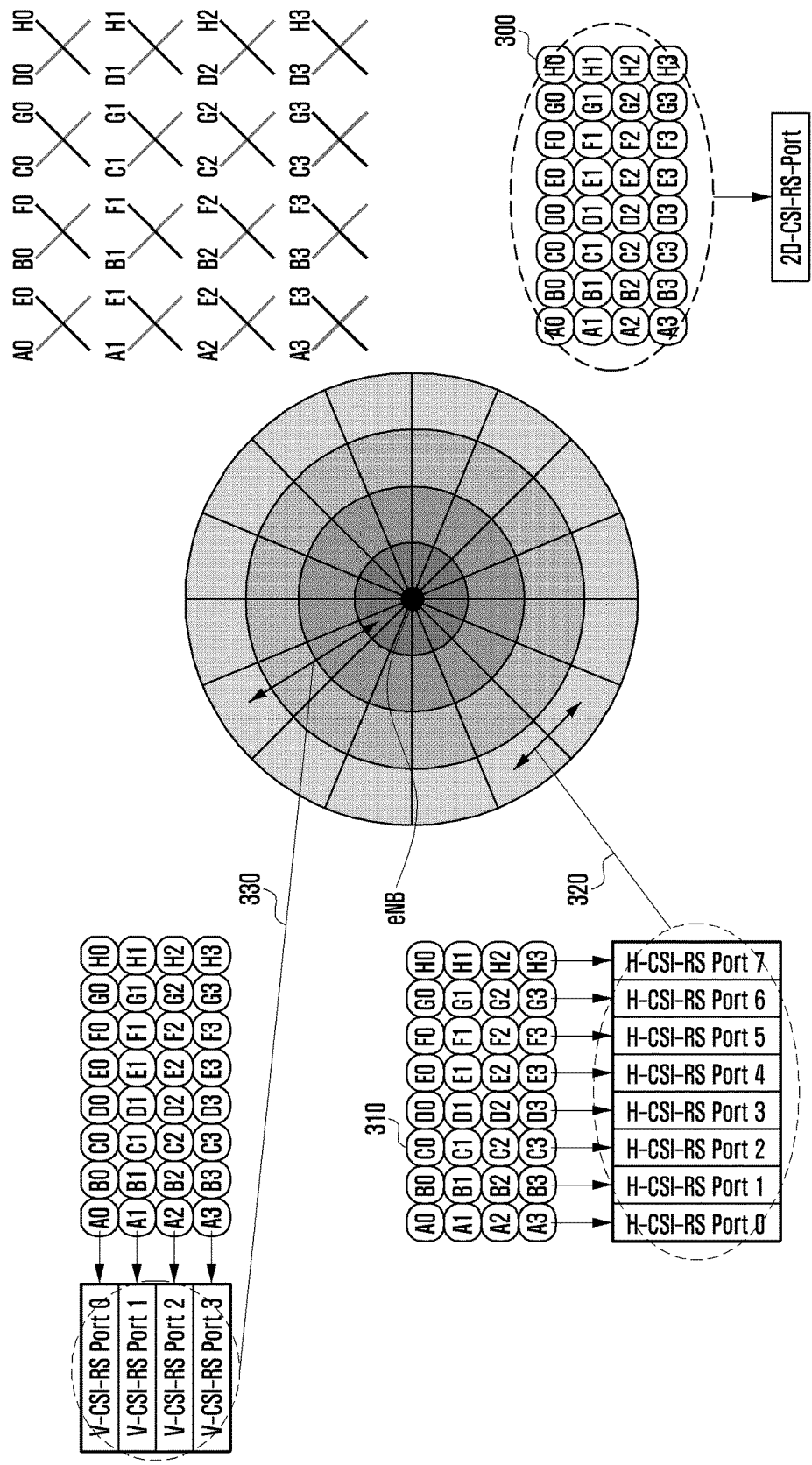
FIG. 7 is a diagram illustrating a mechanism of CSI-RS transmission in FD-MIMO system according to an embodiment of the present invention.

FIG. 7 is a diagram illustrating a mechanism of CSI-RS transmission in FD-MIMO system according to an embodiment of the present invention.

Referring to FIG. 7, the eNB operating in FD-MIMO mode according to an embodiment of the present invention is provided with a total of 32 antennas. Among them, 16 antennas (A0, . . . A3, B0, . . . B3, C0, . . . C3, D0, . . . D3) are arranged at an angle of −45° to the negative direction of the X axis, and the other 16 antennas (E0, . . . E3, F0, . . . F3, G0, . . . F3, H0, . . . H3) are arranged at an angle of +45° to the positive direction of the X axis. The antenna formation in which N/2 antennas and the rest N/2 antennas are arranged to form an angle of 90 degrees at the position is referred to XPOL. The XPOL is used to obtain high antenna gain by arranging a plurality of antenna within a small space.

In the case of XPOL, the first antenna group of N/2 antennas having the same direction and the second antenna group of rest N/2 antennas are arranged at the same position such that the radio channels formed by the respective antenna groups differ in phase from each other. That is, assuming that $N_{Rx} \times 16$ channel matrix between the first antenna group and the UE is $H_1$ ($N_{Rx}$ is the number of receive antennas), the channel matrix $H_2$ between the second antenna group and the UE can be expressed as a scalar product of $H_1$ as equation (1).

$$H_2 = e^{j\phi} H_1 \quad (1)$$

Here, (i, j) component of $H_k$ denotes the channel n from the $j^{th}$ transmit antenna to the $i^{th}$ receive antenna in the $k^{th}$ antenna group.

In FIG. 7, the 32 antennas 300 are indicated by A0, . . . , A3, B0, . . . , B3, C0, . . . , C3, D0, . . . , D3, E0, . . . , E3, F0, . . . , F3, G0, . . . , G3, and H0, . . . , H3. Two CSI-RSs are transmitted through the 32 antennas.

The antenna ports corresponding to H-CSI-RS for use in measuring horizontal channel state consist of the following 8 antenna ports.

H-CSI-RS port 0: transmission signal of antenna A3;
H-CSI-RS port 1: transmission signal of antenna B3;
H-CSI-RS port 2: transmission signal of antenna C3;
H-CSI-RS port 3: transmission signal of antenna D3;
H-CSI-RS port 4: transmission signal of antenna E3;
H-CSI-RS port 5: transmission signal of antenna F3;
H-CSI-RS port 6: transmission signal of antenna G3;
H-CSI-RS port 7: transmission signal of antenna H3.

Grouping plural antennas into one CSI-RS port means antenna virtualization which is implemented through linear combination of plural antennas.

The antenna ports corresponding to V-CSI-RS for use in measuring vertical channel state include the following 4 antenna ports.

V-CSI-RS port 0: transmission signal of antenna A0
V-CSI-RS port 1: transmission signal of antenna A1
V-CSI-RS port 2: transmission signal of antenna A2
V-CSI-RS port 3: transmission signal of antenna A3

In the case that a plurality of antennas is arranged 2-dimensionally in an M×N (vertical direction×horizontal direction) matrix, the FD-MIMO channels may be measured using N horizontal direction CSI-RS ports and M vertical direction CSI-RS ports. That is, when using two CSI-RSs, M+N CSI-RS ports are required for checking the channel state for M×N transmit antennas. It is advantageous to use a relatively small number of CSI-RS ports for checking the information on the relatively large number of the transmit antennas in reducing CSI-RS overhead. In the above case, the channel information on the FD-MIMO transmit antennas is acquired using two CSI-RSs, and this approach can be applied to the case of using K CSI-RSs in the same manner.

In FIG. 7, the 32 transmit antennas are mapped to 8 H-CSI-RS ports and 4 V-CSI-RS ports in order for the UE to measure the radio channels of the FD-MIMO system based thereon. The H-CSI-RS may be used for estimating the horizontal angle between the UE and the eNB transmit antennas as denoted by reference number 310, while the V-CSI-RS may be used for estimating the vertical angle between the UE and the eNB transmit antennas as denoted by reference number 320.

The UE measures the channels based on the plural CSI-RSs and transmits RI, PMI, and CQI generated using the measurement result to the eNB so as to notify the eNB of the radio channels of the FD-MIMO system.

Although the embodiment of FIG. 7 is directed to the case where the CSI-RS is transmitted using 8 H-CSI-RS ports and 4 V-CSI-RS ports, the number of CSI-RS ports can be changed; and although the H-CSI-RS ports correspond to A3, . . . , H3 and the V-CSI-RS ports to A0, . . . , A3, it is also possible to match the H-CSI-RS ports to A1, . . . , H1 or A2, . . . , H2, and to match the V-CSI-RS ports to B1, . . . , B3 to H1, . . . , H3.

Figure 8:
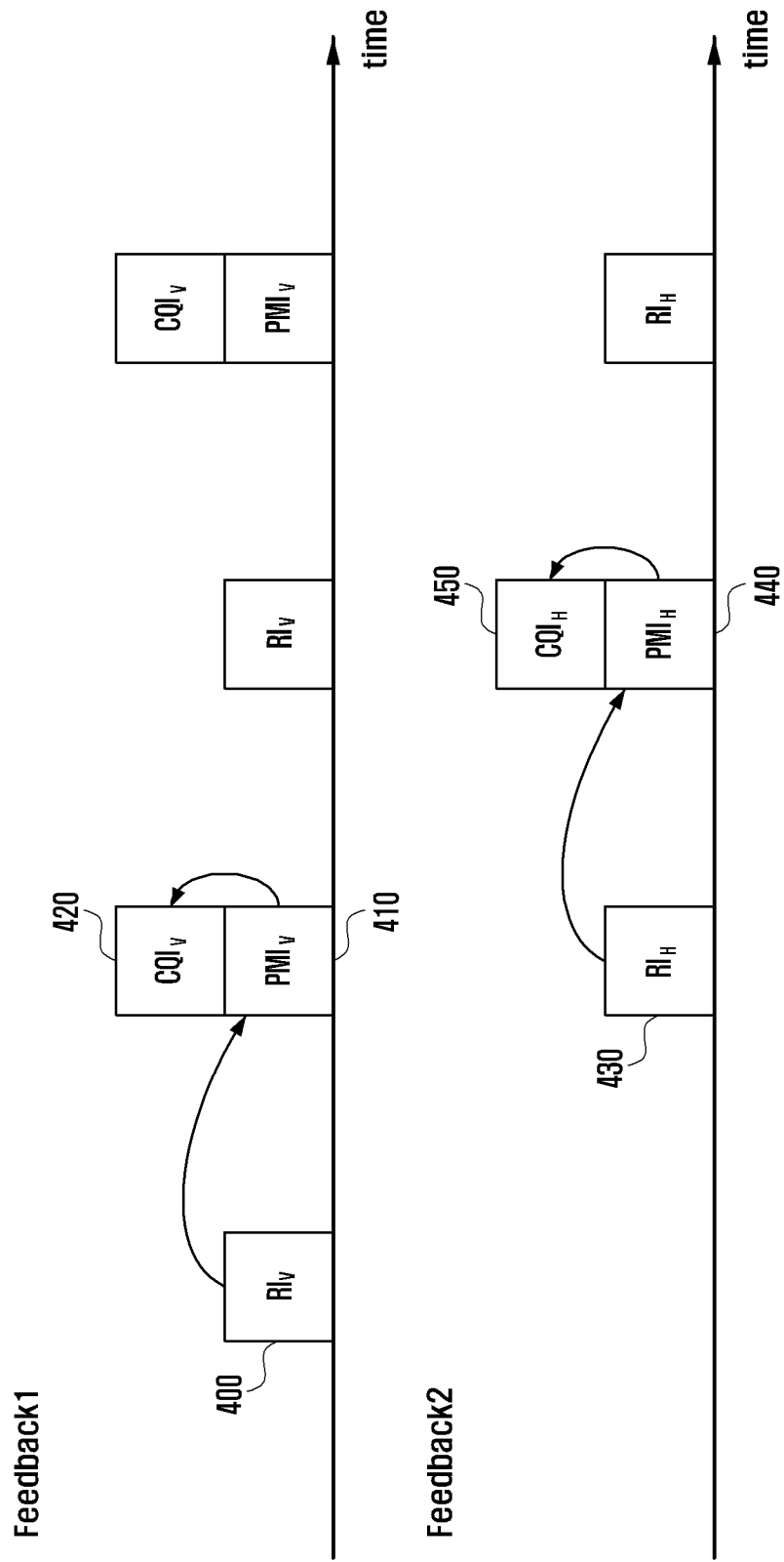
FIG. 8 is a diagram illustrating feedbacks of RI, PMI, and CQI based on two CSI-RS in the feedback method according to an embodiment of the present invention.

FIG. 8 is a diagram illustrating feedbacks of RI, PMI, and CQI based on two CSI-RS in the feedback method according to an embodiment of the present invention.

In FIG. 8, the UE is assigned the first feedback information (feedback 1) and the second feedback information (feedback 2) for as independent feedback informations for V-CSI-RS and H-CSI-RS. That is, the UE measures the V-CSI-RS to feed back the channel state information of feedback 1 and measures the H-CSI-RS to feed back the channel state information of feedback 2.

The RI, PMI, and CQI are transmitted in the state of being correlated among each other. In the case of feedback 1, the $RI_V$ informs of the rank of the precoding matrix indicated by the $PMI_V$. Also, $CQI_V$ indicates the data rate supported by the UE or the value corresponding thereto in the case that the eNB precoding matrix of the corresponding rank which is indicated by $PMI_V$ when the eNB performs transmission at the rank indicated by $RI_V$. That is, the RIV 400 indicates the rank for the subsequent PMIV 410, and the CQIV 420 shows correlation with the data rate in the case that the precoding matrix is applied by the corresponding PMIV 410. Like feedback 1, the RI, PMI, and CQI are transmitted in the state of being correlated among each other in feedback 2.

In the feedback method of FIG. 8, the UE is assigned the feedback for FD-MIMO as follows.

The UE is assigned two CSI-RSs {CSI-RS-1, CSI-RS-2} from the eNB. That is, the eNB configures the UE to receive the two CSI-RSs and measure channels. At this time, the UE may not identify whether the two CSI-RSs are V-CSI-RSs or H-CSI-RSs.

Afterward, the UE is assigned two feedbacks through the Radio Resource Control (RRC) information, which may be configured as shown in table 1.

TABLE 1

| Feedback 1 | Feedback 2 |
|---|---|
| CSI-RS information: CSI-RS-1 | CSI-RS information: CSI-RS-2 |
| Reference port of CSI-RS-1 | Reference port of CSI-RS-2 |
| Reporting mode | Reporting mode |
| PMI codebook information | PMI codebook information |
| Power control parameter | Power control parameter |
| Etc . . . | Etc . . . |

In table 1, the RRC informations on the feedbacks 1 and 2 may be assigned independently. In the feedback information, the PMI codebook information may be the information on a set of the precoding matrices available for the corresponding feedback. In the case that no PMI codebook information is included, all the precoding matrices available for the UE can be used. That is, if the PMI codebook information includes no RRC information for feedback, the UE assumes that all available precoding matrices predefined in the standard can be used. In the feedback informations listed in table 1, other information (etc.) may include at least one of periodic feedback cycle, offset information, and interference measurement resource information.

As shown in FIG. 8, configuring a plurality of feedbacks for a plurality of transmit antennas of the FD-MIMO eNB and instructing the UE to report the channel state information is an embodiment of the state information reporting method for FD-MIMO.

This method is advantageous in that no extra implementation is necessary for the UE to generate the channel state information for FD-MIMO. However, the channel state information report method of FIG. 8 has a drawback in that it is difficult to achieve enough performance gain for the FD-MIMO system. The reason for the lack of FD-MIMO system performance is because the UE cannot not provide CQI generated under the assumption of the precoding for FD-MIMO with the report of the channel state information on which the configuration of plural feedbacks using plural CSI-RSs as shown in FIG. 8.

In the case that plural transmit antennas are arranged 2-dimensionally in the FD-MIMO system as shown in FIG. 7, both the vertical and horizontal direction precodings are applied for the UE. That is, the UE receives the signal to which both of the precodings corresponding to $PMI_H$ and $PMI_V$ of FIG. 8 are applied. However, if the UE reports the $CQI_H$, $CQI_V$ for the case of applying the precodings corresponding to $PMI_H$ and $PMI_V$ separately, the eNB does not receive the CQI for the case where both the vertical and horizontal direction precodings are applied and thus has to determine the CQI when both the precodings are applied. If the eNB determines a certain CQI for the case where both the vertical and horizontal direction precodings are applied, this may cause degradation of the system performance.

In addition to the method of FIG. 8 in which the UE generates and reports the vertical and horizontal feedback information independently, an embodiment of the present invention proposes a feedback method being implemented in such a way of recognizing the two CSI-RSs delivered to the UE as the vertical and horizontal direction channel estimation reference signals of the 2-dimensional antenna structure and selecting the best precoding matrix among the precoding matrices designed suitable for the 2-dimensional antenna structure and XPOL antenna arrangement to report the corresponding rank information, precoding information, and CQI. That is, the present invention proposes a method for the UE to generate the feedback information for FD-MIMO using a set of precoding matrices designed to be suitable for the 2-dimensional antenna structure and XPOL and report the feedback information. The set of precoding matrices defined between the eNB and the UE may be referred to as a codebook, and each precoding matrix of the codebook may be referred to as codeword. In the first embodiment of the present invention, the UE estimates channels using the two CSI-RSs in consideration of the 2-dimensional antenna arrangement, selects the best rank and precoding matrix from the codebook designed in consideration of the XPOL structure, and reports RI, PMI, and CQI generated based on the selected rank and precoding matrix.

As described above, the 2-dimensional XPOL antenna array of FIG. 7 is provided with a total of 32 antennas among which the first group of 16 antennas is arranged to have an angle of −45° to the positive direction of the X axis and the second group of the rest 16 antennas is arranged to having an angle of +45° to the positive direction of the X axis. At this time, the two antenna groups are arranged at the same position. Accordingly, the $N_{Rx} \times 16$ channel matrix $H_2$ between the second antenna group and the UE can be expressed as a scalar product of the $N_{Rx} \times 16$ channel matrix $H_1$ between the first antenna group and the UE as shown in equation (2):

$$H_2 = e^{j\phi} H_1. \tag{2}$$

Accordingly, the $N_{Rx} \times 32$ channel matrix H for the 32 antennas forming the first and second antenna groups is expressed in the form of equation (3):

$$H = [H_1 \; e^{j\phi} H_1]. \tag{3}$$

A description is made of the method for selecting the best precoding matrix for the channel matrix of equation (3) in rank 1. In this case, the precoding matrix maximizing Signal to Noise Ratio (SNR) is selected using the method expressed by equation (4):

$$\hat{p} = \underset{p}{\operatorname{argmax}} \|HP\| = \underset{p_1, p_2}{\operatorname{argmax}} \left\| [H_1 \; e^{j\phi} H_1] \begin{bmatrix} p_1 \\ p_2 \end{bmatrix} \right\| = \underset{p_1, p_2}{\operatorname{argmax}} \|H_1 p_1 + e^{j\phi} H_1 p_2\| \tag{4}$$

Here, $$P = \begin{bmatrix} P_1 \\ P_2 \end{bmatrix}$$

denotes 32×1 precoding matrix. $P_1$ and $P_2$ denote 16×1 beamforming vectors for forming the beams in specific directions in combination with the channel matrix. In equation (4), the precoding matrix maximizing SNR has to have the property of equation (5):

$$p_2 = e^{-j\phi} p_1 \tag{5}$$

Accordingly, the precoding matrix for rank 1 to maximize SNR has to be structured in the form of equation (6):

$$p = \begin{bmatrix} p_1 \\ e^{-j\phi} p_1 \end{bmatrix} \tag{6}$$

That is, equation (6) shows that a good precoding matrix is designed to match the phases of the two antennas groups of the XPOL in forming the respective beams with the same beamforming vector.

By referencing the rank 1 precoding matrix design of equation (6), it is possible to see that the SNR of each transmission layer is maximized when equation (6) is applied per column of the precoding matrix for rank 1 or above. Through the above-described method, the rank 2 precoding matrix can be designed as equation (7):

$$P = \begin{bmatrix} p_1 & p_1' \\ e^{j\phi} p_1 & -e^{-j\phi} p_1' \end{bmatrix} \tag{7}$$

In equation (7), $P_1$ and $P_1'$ are the same vector or orthogonal vectors. This is because it is known that the precoding matrix is designed to have the unitary matrix property to maximize SNR.

Due to the limitation of the feedback information amount available from the UE to the eNB, it is impossible to transmit the mathematically optimal precoding matrix to a specific channel matrix directly. Accordingly, in the real system, a set of a predetermined number of precoding matrices is defined as a codebook available between the UE and the eNB such that the UE feeds back the index of a precoding matrix to the eNB.

In the case of designing the rank 1 codebook available for XPOL having N antennas in consideration of the rank 1 codebook structure of equation (6), the precoding matrix can be determined based on two indices in the codebook as shown in equation (8):

$$P(i_1, i_2) = W_1(i_1) W_2(i_2) \tag{8}$$

where $$W_1(i_1) = \begin{bmatrix} X(i_1) & 0 \\ 0 & X(i_1) \end{bmatrix},$$

$$X(i_1) = \begin{bmatrix} p_1^{(i_1)} & \cdots & p_M^{(i_1)} \end{bmatrix},$$

$$p_m^{(i_1)} \in \{c_0, c_1, \ldots, c_{Q-1}\},$$

and $$W_2(i_2) = \frac{1}{\sqrt{2}} \begin{bmatrix} e_m \\ \alpha^k e_m \end{bmatrix},$$

$$\alpha = e^{-\frac{j2\pi}{K}},$$

$$i_2 = K(m-1) + k,$$

$$m = 1, 2, \ldots, M,$$

$$k = 0, 1, \ldots, K-1..$$

Here, $c_q$ denotes a $$\frac{N}{2} \times 1$$

beamforming vector for N/2 antennas of the antenna group arranged at the same angle in XPOL under the assumption that Q beamforming vectors are available in equation (8). $e_m$ denotes a unitary vector having all zero elements with the exception of $m^{th}$ element having the value of 1 such that $P_m(i_1)$ as the $m^{th}$ column of the diagonal block matrix $X(i_1)=[P_1(i_1) \ldots P_M(i_1)]$ of $W_1(i_1)$ is selected as the beamforming vector. That is, the final precoding matrix obtained in combination based on the determination of index $(i_1, i_2)$ is expressed as equation (9) like equation (6).

$$P(i_1, i_2) = W_1(i_1)W_2(i_2) = \begin{bmatrix} p_m^{(i_1)} \\ e^{-j\frac{2\pi}{K}k} p_m^{(i_1)} \end{bmatrix}, \quad (9)$$

where $$i_2 = K(m-1) + k$$

The properties of index $(i_1, i_2)$ determining the precoding matrix are as follows.

First, $i_1$ indicates M beamforming vector candidates selectable for the current channel among all beamforming vectors of the codebook. Also, $i_2$ is used for selecting the best beamforming vector to be used with the current channel among the beamforming vector candidates indicated by $i_1$ and adjusting the phases of the antenna groups.

A method of designing the rank 1 codebook appropriate for XPOL having N antennas which has been described with reference to equations (8) and (9) may be extended to take rank 2 into consideration. That is, the precoding matrix in a rank 2 codebook may be determined with two indices as expressed by equation (10):

$$P(i_1, i_2) = W_1(i_1)W_2(i_2) \quad (10)$$

where $$W_1(i_1) = \begin{bmatrix} X(i_1) & 0 \\ 0 & X(i_1) \end{bmatrix},$$

$$X(i_1) = \begin{bmatrix} p_1^{(i_1)} & \ldots & p_M^{(i_1)} \end{bmatrix},$$

$$p_m^{(i_1)} \in \{c_0, c_1, \ldots, c_{Q-1}\},$$

and $$W_2(i_2) = \frac{1}{\sqrt{2}}\begin{bmatrix} e_{m1} & e_{m2} \\ \alpha^k e_{m1} & -\alpha^k e_{m2} \end{bmatrix},$$

$$\alpha = e^{-j\frac{2\pi}{K}},$$

$$i_2 = K(m-1) + k,$$

$$m = f(m1, m2), m1 \in \{1, \ldots M\},$$

$$m2 \in \{1, \ldots M\},$$

$$k = 0, 1, \ldots, K-1.$$

In equation (10), m is determined by (m1, m2), and m1 and m2 are used to select a beam vector appropriate for each column of the precoding matrix. The final precoding matrix combined after the determination of the index $(i_1, i_2)$ is expressed as equation (11) like equation (7).

$$P(i_1, i_2) = W_1(i_1)W_2(i_2) = \begin{bmatrix} p_{m1}^{(i_1)} & p_{m2}^{(i_1)} \\ e^{-j\frac{2\pi}{K}k} p_{m1}^{(i_1)} & -e^{-j\frac{2\pi}{K}k} p_{m2}^{(i_1)} \end{bmatrix}. \quad (11)$$

$$i_2 = K(m-1) + k,$$

$$m = f(m1, m2).$$

In designing the codebook of the precoding matrices, the remaining part is to define a set of beamforming vectors $\{C_0, C_1, \ldots, C_{Q-1}\}$ and determine the relationship between $P_m(i_1)$ and $C_q$.

In an embodiment of the present invention, Discrete Fourier Transform (DFT) beamforming vectors may be used to define the beamforming vector set $\{C_0, C_1, \ldots, C_{Q-1}\}$. That is, in order to define the beamforming vector set $\{C_0, C_1, \ldots, C_{Q-1}\}$, Q columns of Q×Q DFT matrix are selected to use first N/2 elements as $C_0, C_1, \ldots, C_{Q-1}$. The $q^{th}$ beamforming vector can be expressed as equation (12).

$$c_q = \begin{bmatrix} 1 & e^{\frac{j2\pi q}{Q} \cdot 1} & e^{\frac{j2\pi q}{Q} \cdot 2} & \ldots & e^{\frac{j2\pi q}{Q} \cdot (N/2)} \end{bmatrix}^T \quad (12)$$

As an exemplary method of defining the relationship between $P_m(i_1)$ and $C_q$, it can be considered to include the beamforming vector having M consecutive indices in $X(i_1)=[P_1(i_1) \ldots P_M(i_1)]$ and map the starting value of the M consecutive indices to $i_1$. Assuming that $i_1$ is made up of 4 bits to express a value in the range from 0 to 15 and Q=32 and M=4, the relationship between $P_m(i_1)$ and $C_q$ which is defined to include the beamforming vector having 4 consecutive indices in $X(i_1)$ and 32 vectors are included evenly for 16 $i_1$ is expressed as equation (13).

$$p_m^{(i1)} = c_{(2i_1 + m - 1) \bmod 32}, i_1 = 0, 1, \ldots, 15, m = 0, 1, 2, 3 \quad (13)$$

Equation (13) can be expressed in more detail as equation (14).

$$X(0)=[c_0,c_1,c_2,c_3], X(1)=[c_2,c_3,c_4,c_5], X(2)=[c_4,c_5,c_6,c_7], X(3)=[c_6,c_7,c_8,c_9], \ldots, X(13)=[c_{26},c_{27},c_{28},c_{29}], X(14)=[c_{28},c_{29},c_{30},c_{31}], X(15)=[c_{30},c_{31},c_0,c_1]. \quad (14)$$

In another example, assuming that $i_1$ is made up of 5 bits to express a value in the range from 0 to 31 and Q=64 and M=2, the relationship between $P_m(i_1)$ and $C_q$ which is defined to include the beamforming vector having 2 consecutive indices in $X(i_1)$ and 64 vectors are included evenly for 32 $i_1$ is expressed as equation (15).

$$p_m^{(i1)} = c_{(2i_1 + m - 1)}, i1 = 0, 1, \ldots, 31, m = 0, 1 \quad (15)$$

$$X(0)=[c_0,c_1], X(1)=[c_2,c_3], X(2)=[c_4,c_5], X(3)=[c_6,c_7], \ldots, X(30)=[c_{60},c_{61}], X(31)=[c_{62},c_{63}]. \quad (16)$$

Once the codebook using the DFT beamforming vectors and relationship between $P_m(i_1)$ and $C_q$ has been defined based on equation (8), the UE can estimate channels of the N transmit antennas arranged 2-dimensionally based on the two CSI-RSs and generate to PMIs $i_1$ and $i_2$ and CQI defining the best rank and precoding matrix. Afterward, if the UE reports the determined rank, $i_1$ and $i_2$, and CQI at the determined timing, the eNB may check the channel information about the UE by referencing the predefined codebook and use the checked information for data scheduling associated with the UE. Here, the rank, $i_1$ and $i_2$, and CQI may be carried along with uplink data at the same timing or along with uplink control channels at independent timings. Particularly when $i_1$ and $i_2$ are reported at independent timings, it is more efficient to transmit $i_2$ at an interval shorter than that of $i_1$. That is, $i_1$ is reported at a relatively long interval to notify the eNB of the set of available beamforming vectors, and $i_2$ is reported at a relatively short interval to select the beamforming vector most suitable for the actual fading channel and match the phases of the antenna groups. At this time, $i_1$ is used to indicate M beamforming vector candidates selectable for the current channel among all the beamforming vectors in the codebook, and $i_2$ is used to select the beamforming vector to be used actually and adjust the phases of the antenna groups.

A description is made of the UE operation in the case that the codebook of using the DFT beamforming vectors and relationship between $P_m(i_1)$ and $C_q$ is defined based on equation (8) according to the first embodiment of the present invention.

Figure 9:
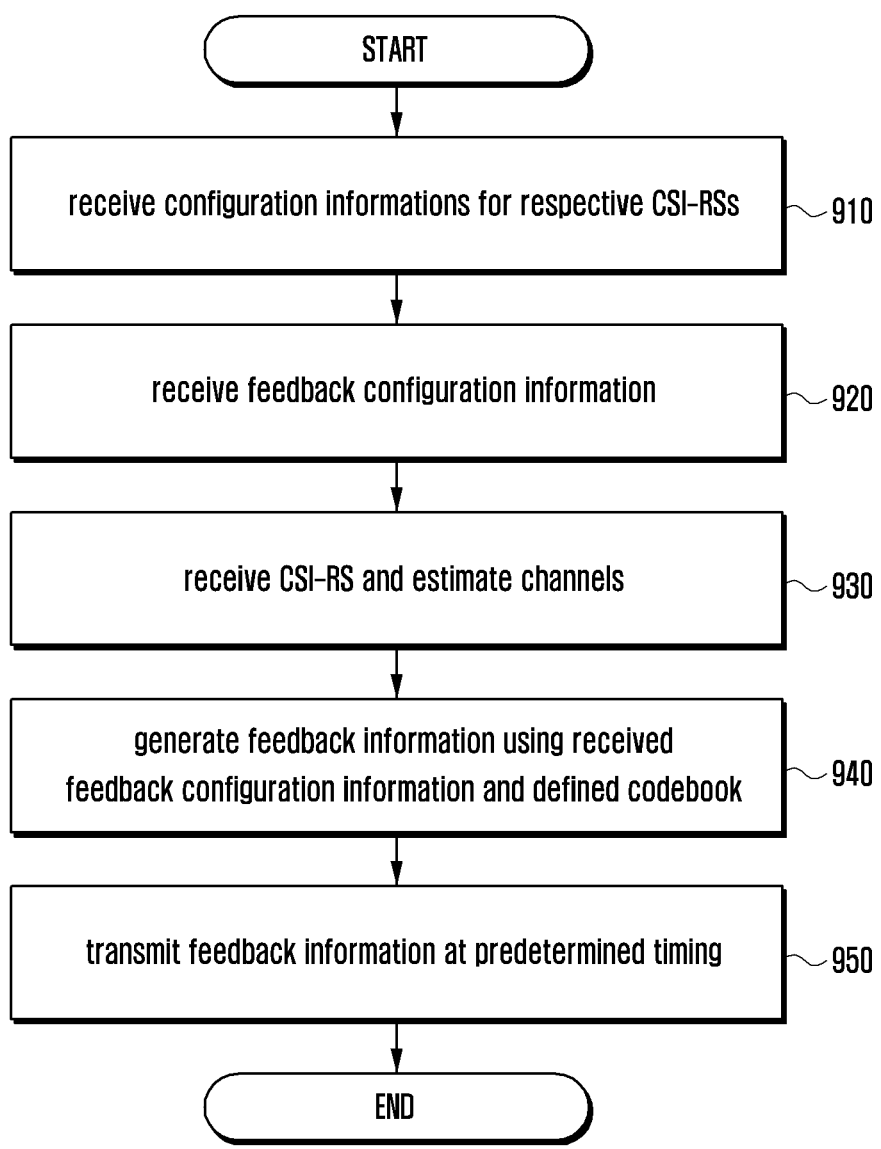
FIG. 9 is a flowchart illustrating the operation procedure of the UE according to an embodiment of the present invention.

FIG. 9 is a flowchart illustrating the operation procedure of the UE according to an embodiment of the present invention.

Referring to FIG. 9, the UE receives the configuration information on two CSI-RSs for use in vertical and horizontal direction channel estimation at step 910. The UE checks the information on the numbers of ports of respective CSI-RSs, CSI-RS transmission timings and resource locations, sequences, and transmit power, entirely or partially based on the received configuration information.

Next, the UE checks the two CSI-RSs-based feedback configuration information at step 920. According to the first embodiment of the present invention, the two CSI-RSs-based feedback configuration may be made up of all or some of the RRC informations as shown in table 2.

TABLE 2

Feedback Configuration

First channel information (horizontal channel): CSI-RS-1
Second channel information (vertical channel): CSI-RS-2
Reference port of CSI-RS-1
Reference port of CSI-RS-2
Reporting (feedback) mode
PMI codebook information
Power control parameter
Etc . . .

Referring to table 2, the feedback configuration is of the two CSI-RSs (CSI-RS-1 and CSI-RS 2) and includes the information on the matches of the respective CSI-RSs to the first and second channel information (first channel information (horizontal channel): CSI-RS and second channel information (vertical channel): CSI-RS-2). Although the present embodiment is directed to the exemplary case where the first and second channel informations correspond to the horizontal and vertical direction CSI-RSs, the present invention is not limited thereto but embodied by matching the first and second channel informations to the respective vertical and horizontal direction CSI-RSs.

Referring to tables 1 and 2, the reference ports are configured for the respective CSI-RSs (CSR-RS-1 and CSI-RS-2).

Figure 10:
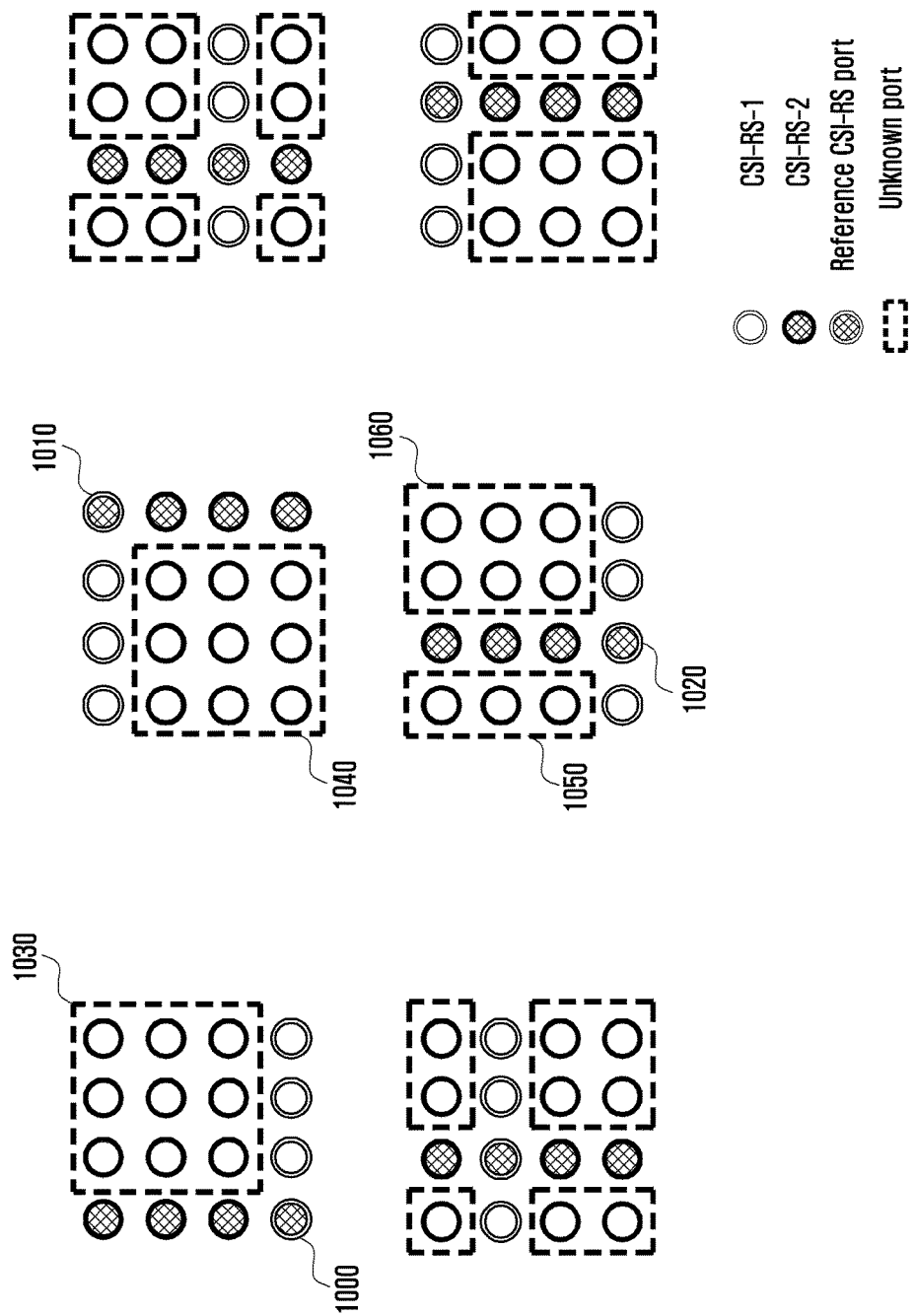
FIG. 10 is a diagram exemplifying two CSI-RSs configuration for 4×4 antenna arrangement.

FIG. 10 is a diagram exemplifying two CSI-RSs configuration for 4×4 antenna arrangement.

In FIG. 10, the CSI-RS ports 1000, 1010, and 1020 are reference CSI-RS ports. The reference CSI-RS port is the CSI-RS port for transmitting the reference signal using the same antenna configuration for generating the channel state information based on the respective CSI-RSs. That is, the eNB configures one of the CSI-RS ports corresponding to the respective CSI-RSs as reference CSI-RS port to indicate that it is a part of transmitting the reference signals with the same antenna configuration for both the CSI-RS-1 and CSI-RS-2, and the UE can estimate the rest channels 1030, 1040, 1050, and 1060 that are not known accurately using the Kronecker product based on the channels estimated through the CSI-RS-1 and CSI-RS-2 based on such information.

Reference CSI-RS port indication method 1: Indication as specified in the standard;
Reference CSI-RS port indication method 2: Indication through RRC signaling;
Reference CSI-RS port indication method 3: Indication through L1 signaling;

The referent CSI-RS port indication method 1 is the method specified in the standard. That is, the UE can identify the type of a reference CSI-RS port according to a rule predefined in the standard. For example, the rule may state that the CSI-RS port with the lowest port index among the CSI-RS ports configured to the respective CSI-RSs is the reference CSI-RS port, that the CSI-RS port having the highest port index among the CSI-RS ports configured to the respective CSI-RSs is the reference CSI-RS port, or that the CSI-RS port having the second port index among the CSI-RS ports configured to the respective CSI-RSs is the reference CSI-RS port. Also, it is possible to determine the reference CSI-RS based on various parameters such as cell ID, UE ID, subframe index, and CSI-RS RNTI other than fixing a specific port number. The UE may retain the information on the reference CSI-RS port predetermined by a rule predefined in the standard and identify reference CSI-RS port based on the information. Such methods are advantageous in terms of causing no signaling overhead due to the predefinition of the reference CSI-RS port but may be difficult to configure the reference CSI-RS port diversely. The reference CSI-RS port indication method 2 is using the RRC signaling. The information such as tables 1 and 2 is transmitted from the eNB to the UE through RRC signaling. At this time, the index of the reference CSI-RS ports corresponding to the respective CSI-RSs are transmitted to the UE AS exemplified in tables 1 and 2. In the case that the reference CSI-RS ports are configured as exemplified in table 1, the UE receives the configuration information at step S910 of FIG. 9; and in the case that the reference CSI-RS ports are configured as exemplified in table 2, the UE receives the configuration information at step S920 of FIG. 9. This method uses extra RRC signaling necessary for configuring the reference CSI-RS ports but is advantageous in that a specific reference CSI-RS port can be used diversely in consideration of the antenna arrangements of the eNB and the UE and the time-frequency resource status. However, in the RRC signaling-based configuration method it may be difficult to change the reference CSI-RS port dynamically.

The reference CSI-RS port indication method 3 is using the L1 signaling. The eNB may notify the UE of the indices of the reference CSI-RS ports corresponding to the CSI-RSs through Physical Downlink Control Channel (PDCCH). This method is advantageous in terms of using specific reference CSI-RS ports diversely in consideration of the antenna arrangements of the eNB and the UE and the time-frequency resource status. The L1 signaling is advantageous in terms of delivering the information more dynamically than the RRC signaling but may need a relatively high signaling overhead.

Although the reference CSI-RS port indication methods 1, 2, and 3 are directed to the case of configuring the reference CSI-RS ports corresponding to the respective CSI-RS-1 and CSI-RS-2, they can be used to configure a common reference CSI-RS port. It is also possible to indicate the reference CSI-RS ports corresponding to the respective CSI-RSs using different methods. For example, the reference CSI-RS port corresponding to the CSI-RS-1 may be designated through the reference CSI-RS port indication method 1 as specified in the standard, while configuring the reference CSI-RS port corresponding to the CSI-RS-2 using the reference CSI-RS port indication method 2.

Referring to FIG. 2, the feedback configuration information includes the reporting or feedback mode information indicating the kinds of the feedback informations which the UE has to generate and report. That is, the feedback mode information is of commanding the UE to estimate the channels formed by N transmit antennas arranged 2-dimensionally using the CSI-RS-1 and CSI-RS-2 and generate and report the best rank for the channels, two PMIs i1 and i2 defining the precoding matrices, and CQI to the eNB. In addition, the feedback mode information may include whether the i2 and CQI has to be reported in the form of per-subband informations or a wideband information.

The PMI codebook information is the information on the set of precoding matrices available for the current channel condition in the codebook. If the PMI codebook information includes not RRC information for feedback, the UE assumes that all precoding matrices of the codebook can be used for feedback. Among the feedback configuration informations listed in table 2, the other information (etc.) may include feedback cycle for periodic feedback, offset information, and interference measurement resource information.

At step 930, the UE receives the CSI-RSs identified at step 910. The UE estimates the channels between $N=N_H N_V$ 2-dimensionally arranged eNB antennas and $N_{Rx}$ and $N_{Rx}$ receive antennas. Here, $N_H$ and $N_V$ denote the number of the horizontal and vertical direction CSI-RS antenna ports, respectively. Assuming that the $N_{Rx} \times N_H$ channel matrix estimated based on the CSI-RS-1 is $$H_H = \begin{bmatrix} h_1^{(H)} \\ \vdots \\ h_{N_{Rx}}^{(H)} \end{bmatrix}$$

and the $N_{Rx} \times N_V$ channel matrix for the 2-dimensional transmit antennas is $$H_V = \begin{bmatrix} h_1^{(V)} \\ \vdots \\ h_{N_{Rx}}^{(V)} \end{bmatrix},$$

the $N_{Rx} \times (N_H N_V)$ channel matrix for $N=N_H N_V$ 2-dimensional transmit antennas can be expressed as equation (17).

$$H_{HV} = \begin{bmatrix} \gamma_1(h_1^{(H)}/\gamma_{H_1} \otimes h_1^{(V)}/\gamma_{V_1}) \\ \vdots \\ \gamma_{Rx}(h_{N_{Rx}}^{(H)}/\gamma_{H_{Rx}} \otimes h_{N_{Rx}}^{(V)}/\gamma_{V_{Rx}}) \end{bmatrix} \quad (17)$$

In equation (17), $\otimes$ denotes the Kronecker product of the matrix, and the Kronecker product between matrices A and b can be expressed as equation (18).

$$A \otimes B = \begin{bmatrix} a_{11}B & \cdots & a_{1n}B \\ \vdots & \ddots & \vdots \\ a_{m1}B & \cdots & a_{mn}B \end{bmatrix}. \quad (18)$$

In equation (18), $$A = \begin{bmatrix} a_{11} & \cdots & a_{1n} \\ \vdots & \ddots & \vdots \\ a_{m1} & \cdots & a_{mn} \end{bmatrix}.$$

Equation (18) shows that when the horizontal and vertical direction CSI-RS antenna ports are $N_H$ and $N_V$ respectively, the channels between the $N=N_H N_V$ 2-dimensionally arranged eNB antennas and $N_{Rx}$ receive antennas are equivalent to the channels formed through the Kronecker product of individual receive antennas to the vertical and horizontal channels estimated based on the respective vertical and horizontal direction CSI-RSs.

In equation (17), the scalar values $\gamma_k$, $\gamma_{H_k}$, and $\gamma_{V_k}$ of the kth receive antenna are necessary for converting the influence of the horizontal and vertical antenna virtualization to the channel values for the entire 2-dimensional antennas. $\gamma_{H_k}$ and $\gamma_{V_k}$ are scalar values for normalizing the channels estimated based on the received CSI-RS-1 and CSI-RS-2 to the channels having the same amplitude, and $\gamma_k$ is a scalar value for virtualizing the channels of the CSI-RS-1 and CSI-RS-2 received through the normalized $k^{th}$ receive antenna to the channels arranged 2-dimensionally using the Kronecker product and then being multiplied for recovering the amplitudes of the original channels. As described above, the reference CSI-RS port is the port for transmitting both the CSI-RS-1 and CSI-RS-2 so as to make it possible to estimate the relationship between the channels estimated based on the CSI-RS-1 and CSI-RS-2. The scalar values $\gamma_k$, $\gamma_{H_k}$, and $\gamma_{V_k}$ are determined as follows.

Reference $\gamma_k$, $\gamma_{H_k}$, $\gamma_{V_k}$ determination method 1: use 1, $h_{ref}^{(H)}$, or $|h_{ref}^{(H)}|$ Reference $\gamma_k$, $\gamma_{H_k}$, $\gamma_{V_k}$ determination method 2: use 1, $h_{ref}^{(V)}$, or $|h_{ref}^{(V)}|$ Reference $\gamma_k$, $\gamma_{H_k}$, $\gamma_{V_k}$ determination method 3: use 1, $\max(h_{ref}^{(H)}, h_{ref}^{(V)})$, $\max(|h_{ref}^{(H)}|, |h_{ref}^{(V)}|)$ Reference $\gamma_k$, $\gamma_{H_k}$, $\gamma_{V_k}$ determination method 4: use 1, $\min(h_{ref}^{(H)}, h_{ref}^{(V)})$, or $\min(|h_{ref}^{(H)}|, |h_{ref}^{(V)}|)$ Reference $\gamma_k$, $\gamma_{H_k}$, $\gamma_{V_k}$ determination method 5: 1, $\mathrm{avg}(h_{ref}^{(H)}, h_{ref}^{(V)})$, or $\mathrm{avg}(|h_{ref}^{(H)}|, |h_{ref}^{(V)}|)$ In the above method, $h_{ref}^{(H)}$ and $h_{ref}^{(V)}$ of the reference CSI-RS ports for horizontal and vertical CSI-RSs or the absolute values of the horizontal and vertical CSI-RS port channels $|h_{ref}^{(H)}|$ and $|h_{ref}^{(V)}|$ can be used. It is also possible to (use the maximum, minimum, and average values max $(h_{ref}^{(H)}, h_{ref}^{(V)})$, $\min(h_{ref}^{(H)}, h_{ref}^{(V)})$, and $\mathrm{avg}(h_{ref}^{(H)}, h_{ref}^{(V)})$ of the two can be used, and the reference values for determining the maximum and minimum values may be the absolute values of the respective channels. At this time, max $(|h_{ref}^{(H)}|, |h_{ref}^{(V)}|)$, $\min(|h_{ref}^{(H)}|, |h_{ref}^{(V)}|)$, and $\mathrm{avg}(|h_{ref}^{(H)}|, |h_{ref}^{(V)}|)$ denotes the maximum, minimum, and average values based on the absolute values $|h_{ref}^{(H)}|$ and $|h_{ref}^{(V)}|$ of the channels of the respective reference CSI-RS ports. In order to explain the procedure of establishing the channel with the above values, it is assumed that the channel matrices $h_k^{(H)}$ and $h_k^{(V)}$ of the $k^{th}$ receive antenna for the respective CSI-RSs are $h_k^{(H)} = [h_{k,1}^{(H)} \ldots h_{k,N_H}^{(H)}]$ and $h_k^{(V)} = [h_{k,1}^{(V)} \ldots h_{k,N_V}^{(V)}]$.

For example, assuming that CSI-RS-1 and CSI-RS-2 are configured as denoted by reference number 1000 in FIG. 10, the first CSI-RS port becomes the reference CSI-RS port for the respective CSI-RSs. Since the reference CSI-RS port is the first ports of the respective CSI-RSs, channels $h_{ref}^{(H)}$ and $h_{ref}^{(V)}$ of the reference CSI-RS port become $h_{k,1}^{(H)}$ and $h_{k,1}^{(V)}$. In the case of using $avg(h_{ref}^{(H)}, h_{ref}^{(V)})$, $h_{ref}^{(H)}$, and $h_{ref}^{(V)}$ for $\gamma_k$, $\gamma_{H_k}$, and $\gamma_{V_k}$ values, equation (17) can be expressed as equation (19).

$$\gamma_1(h_1^{(H)}/\gamma_{H_1} \otimes h_1^{(V)}/\gamma_{V_1}) = avg(h_{k,1}^{(H)}, h_{k,1}^{(V)}) \times (h_1^{(H)}/h_{k,1}^{(H)} \otimes h_1^{(V)}/h_{k,1}^{(V)}) \quad (19)$$

Unlike the above example, assuming the CSI-RS-1 and CSI-RS 2 are configured as denoted by reference number 1020 in FIG. 10, the second CSI-RS port of the CSI-RS-1 and the first CSI-RS port of the CSI-RS-2 become the reference CSI-RS port. Accordingly the channels $h_{ref}^{(H)}$ and $h_{ref}^{(V)}$ of the respective reference CSI-RS port become $h_{k,2}^{(H)}$ and $h_{k,1}^{(V)}$. At this time, if $min(|h_{ref}^{(H)}|, |h_{ref}^{(V)}|)$, $h_{ref}^{(H)}$ and $h_{ref}^{(H)}$ are used for the respective $\gamma_k$, $\gamma_{H_k}$, and $\gamma_{V_k}$, equation (17) can be expressed as equation (20).

$$\gamma_k(h_k^{(H)}/\gamma_{H_k} \otimes h_k^{(V)}/\gamma_{V_k}) = min(h_{k,2}^{(H)}, h_{k,1}^{(V)}) \times (h_1^{(H)}/h_{k,2}^{(H)} \otimes h_1^{(V)}/h_{k,2}^{(H)}) \quad (20)$$

Since the reference CSI-RS port is an inevitable element for generating the channel matrix, it has to be informed to the UE, which generates the channel in the form as described above using the reference CSI-RS port information. As described above, various values are applied to the parameters $\gamma_k$, $\gamma_{H_k}$, and $\gamma_{V_k}$ to normalize the channels estimated based on the CSI-RS-1 and CSI-RS-2 and recover the original amplitude. It should be noted that the all the types of values such as $h_{ref}^{(H)}$ and $h_{ref}^{(V)}$; $max(h_{ref}^{(H)}, h_{ref}^{(V)})$, $min(h_{ref}^{(H)}, h_{ref}^{(V)})$, and $avg(h_{ref}^{(H)}, h_{ref}^{(V)})$; $|h_{ref}^{(H)}|$ and $|h_{ref}^{(V)}|$; and $max(|h_{ref}^{(H)}|, |h_{ref}^{(V)}|)$, $min(|h_{ref}^{(H)}|, |h_{ref}^{(V)}|)$, and $avg(|h_{ref}^{(H)}|, |h_{ref}^{(V)}|)$ can be used for the respective parameters $\gamma^k$, $\gamma_{H_k}$, and $\gamma_{V_k}$. Also, it should be noted that although the reference CSI-RS-port is changed due to the antenna arrangement unlike those as denoted by reference numbers 1000 and 1020 the basic channel virtualization procedure is not changed significantly with the exception of the change of the parameters $\gamma_k$, $\gamma_{H_k}$, and $\gamma_{V_k}$ for normalization and channel amplitude recovery. Also, in the case of virtualizing the channel using single-dimensional values such as, $h_{ref}^{(H)}$, $|h_{ref}^{(H)}|$, $h_{ref}^{(V)}$, and $|h_{ref}^{(V)}|$, the effect of the present invention can be achieved with the original value of the channel of the reference dimension and the equation of compensating the value for normalization. For example, in the case of virtualizing the value of the horizontal dimension, the method of equation (17) gives the same effect as $\gamma_1(h_1^{(H)}/\gamma_{H_1} \otimes h_1^{(V)}/\gamma_{V_1}) = \gamma_{H_1}(h_1^{(H)}/\gamma_{H_1} \otimes h_1^{(V)}/\gamma_{V_1}) = h_1^{(H)} \otimes \gamma_{H_1} h_1^{(V)}/\gamma_{V_1}$. Also, in the case that each CSI-RS configuration includes the power control parameter as shown in table 1, it is possible to use the corresponding parameter to determine the $\gamma^k$, $\gamma_{H_k}$, and $\gamma_{V_k}$, and channels $h_1^{(H)}$ and $H_1^{(V)}$. For example, in the case that the power boosting is applied differently to the horizontal and vertical channel reference signals or it is necessary to compensate strengths of other signals, the corresponding parameter can be applied to the respective CSI-RS configuration to estimate the real channels. Also, it is possible to generate CSI by reflecting the power increase for a new purpose to the channel virtualized with the power control parameter of table 1.

The eNB notifies the UE of the information such as $h_{ref}^{(H)}$, $h_{ref}^{(V)}$, $max(h_{ref}^{(H)}, h_{ref}^{(V)})$, $min(h_{ref}^{(H)}, h_{ref}^{(V)})$, $avg(h_{ref}^{(H)}, h_{ref}^{(V)})$, $|h_{ref}^{(H)}|$, $|h_{ref}^{(V)}|$, $max(|h_{ref}^{(H)}|, |h_{ref}^{(V)}|)$, $min(|h_{ref}^{(H)}|, |h_{ref}^{(V)}|)$, and $avg(|h_{ref}^{(H)}|, |h_{ref}^{(V)}|)$ for the parameters $\gamma_k$, $\gamma_{H_k}$, and $\gamma_{V_k}$ necessary for the above-described channel virtualization as follows.

Reference $\gamma_k$, $\gamma_{H_k}$, $\gamma_{V_k}$ indication method 1: indicate as defined in standard;

Reference $\gamma_k$, $\gamma_{H_k}$, $\gamma_{V_k}$ indication method 2: indicate through RRC signaling; and Reference $\gamma_k$, $\gamma_{H_k}$, $\gamma_{V_k}$ indication method 3: indicate through L1 signaling.

The reference $\gamma_k$, $\gamma_{H_k}$, $\gamma_{V_k}$ indication method 1 may follow the standard. The UE may determines the parameters to be used for the parameters $\gamma_k$, $\gamma_{H_k}$, and $\gamma_{V_k}$ according to the rule specified in the standard. For example, the rule may state for the parameters $\gamma_k$, $\gamma_{H_k}$, and $\gamma_{V_k}$ that the normalization is performed based on the reference CSI-RS port of the CSI process with a low index for use, that the normalization is performed based on the reference CSI-RS port of the CSI process with a high index for use, that the normalization is performed based on average value of the reference CSI-RS channel of the CSI-RS process for CSI report for use, that the normalization is performed based on the minimum value of the reference CSI-RS channel of the CSI process for CSI-RS report, and that the normalization is performed based on the maximum value of the reference CSI-RS channel of the CSI process for CSI report. In this method, the parameters $\gamma_k$, $\gamma_{H_k}$, and $\gamma_{V_k}$ to be used for normalization and recovery of the parameters are specified in advance, and the UE has the information on the parameters. The case of the reference $\gamma_k$, $\gamma_{H_k}$, and $\gamma_{V_k}$ indication method 1 is advantageous in terms of generating no additional signaling overhead because the UE has the information on the parameters for UEs in normalization and recovery.

The reference $\gamma_k$, $\gamma_{H_k}$, $\gamma_{V_k}$ indication method 2 is using the RRC signaling. The UE may send the UE the reference CSI-RS port information using the reference CSI-RS port index corresponding to the respective parameters along with the information listed in tables 1 and 2 through RRC signaling. In the case that the reference CSI-RS port is configured in the format of table 1, the UE receives such configuration at step 910 of FIG. 9 and, otherwise in the format 2, at step 920 of FIG. 9. Table 3 exemplifies the parameter configuration.

TABLE 3

| Value | Parameter |
| --- | --- |
| 00 | $h_{ref}^{(H)}$ |
| 01 | $h_{ref}^{(V)}$ |
| 10 | $avg(h_{ref}^{(H)}, h_{ref}^{(V)})$ |
| 11 | $min(h_{ref}^{(H)}, h_{ref}^{(V)})$ |

As shown in table 3, the eNB sends the UE the corresponding value through RRC signaling such that the UE determines the value of the parameter for normalization and recovery and performs channel virtualization using the corresponding parameter in the channel normalization or recovery procedure. The above method is just one of feasible embodiments and can be implemented with other table having various parameter combinations as well as the above-described tables. This method may require extra RRC signaling for designating the parameters but may be advantageous in that the parameters required for normalization and recovery in the channel virtualization procedure can be used diversely in consideration of the antenna arrangements of the eNB and the UE and the time-frequency resource status.

However, the RRC signaling-based parameter configuration method may make it impossible to use the reference $\gamma_k$, $\gamma_{H_k}$, and $\gamma_{V_k}$ dynamically.

The reference $\gamma_k$, $\gamma_{H_k}$, $\gamma_{V_k}$ indication method 3 is using the L1 signaling. The eNB may send the UE the reference $\gamma_k$, $\gamma_{H_k}$, and $\gamma_{V_k}$ indices corresponding to the respective CSI processes, which are selected among the parameters in table 3, dynamically on PDCCH. This method requires extra L1 signaling but is advantageous in that the parameters required for normalization and recovery in the specific channel virtualization procedure can be used dynamically in consideration of the antenna arrangements of the eNB and the UE and the time-frequency resource status. Also, since the L1 signaling can be performed more dynamically as compared to the RRC signaling, it is advantageous in terms of adopting the channel and time conditions quickly but may need a relatively high signaling overhead. Although the reference $\gamma_k$, $\gamma_{H_k}$, and $\gamma_{V_k}$ indication methods 1, 2, and 3 are directed to the procedure of configuring the parameters required for normalization and recovery process in the respective channel virtualization procedure for CSI-RS-1 and CSI-RS-2, it is also possible to configure the parameters necessary for a common normalization and recovery process. For example, the reference $\gamma_k$, $\gamma_{H_k}$, $\gamma_{V_k}$ indication method 1 method may be used to designate the port for the case of CSI-RS-1 while the reference $\gamma_k$, $\gamma_{H_k}$, $\gamma_{V_k}$ indication method 2 is used to configure the port through RRC signal for CSI-RS-2.

In the case that no channel value is generated in the channel virtualization procedure using the reference CSI-RS port indication methods or the reference $\gamma_k$, $\gamma_{H_k}$, $\gamma_{V_k}$ indication methods, e.g. if only the CSI-RS-1 channel is established but the CSI-RS-2 channel is not generated due to the timing mismatch or other problems at the channel state information reporting timing, the channel virtualization is performed with the most recently generated CSI-RS-2 channel so as to solve the corresponding problem. In the case that the reference CSI-RS port or reference $\gamma_k$, $\gamma_{H_k}$, $\gamma_{V_k}$ values are not delivered to the eNB, default values may be used by applying the reference CSI-RS port indication method 1 or the reference $\gamma_k$, $\gamma_{H_k}$, $\gamma_{V_k}$ indication method 1.

The UE estimates channels between the 2-dimensionally arranged $N=N_H N_V$ eNB antennas and $N_{Rx}$ receive antennas at step 903, and the procedure goes to step 940. At step 940, the UE generates the feedback information such as RI, PMI i1 and i2, and CQI based on the feedback configuration received at step 920 and the predefined codebook. Next, the UE sends the eNB the feedback information at the feedback timing determined according to the feedback configuration at step 950 and ends the procedure of reporting the feedback information generated in consideration of a 2-dimensional antenna arrangement.

In order to generate the wideband and subband CQIs using the above methods, the average channel is calculated on the estimated frequency and time resources. In the case of 1-dimensional channel estimation, it is enough to average the resources. In the case of multi-dimensional channel estimation, it is necessary to average in various dimensions. Such average channels can be calculated as follows.

Multi-dimension average channel calculation method 1: average channels in respective dimensions first and then generate channels corresponding to multiple dimensions.

Multi-dimension average channel calculation method 2: generate channels corresponding to multiple dimensions for respective time and frequency channels.

In the case of using the multi-dimension average channel calculation method 1, the UE estimates average channels based on the horizontal and vertical CSI-RSs and then generates the channels corresponding to the multiple dimensions. Accordingly, equation (17) can be expressed as equation (21).

$$E[H_{HV}] = \begin{bmatrix} \gamma_1(E[h_1^{(H)}/\gamma_{H_1}] \otimes E[h_1^{(V)}/\gamma_{V_1}]) \\ \vdots \\ \gamma_{Rx}(E[h_{N_{Rx}}^{(H)}/\gamma_{H_{Rx}}] \otimes E[h_{N_{Rx}}^{(V)}/\gamma_{V_{Rx}}]) \end{bmatrix} \quad (21)$$

In the case of using the multi-dimension average channel calculation method 2, the UE generates the channels corresponding to multiple dimensions for the horizontal and vertical CSI-RSs and then estimates average channels. Accordingly, equation (17) can be expressed as equation (22)

$$E[H_{HV}] = \begin{bmatrix} E[\gamma_1(h_1^{(H)}/\gamma_{H_1} \otimes h_1^{(V)}/\gamma_{V_1})] \\ \vdots \\ E[\gamma_{Rx}(h_{N_{Rx}}^{(H)}/\gamma_{H_{Rx}} \otimes h_{N_{Rx}}^{(V)}/\gamma_{V_{Rx}})] \end{bmatrix} \quad (22)$$

In equations (21) and (22), $E[H_{HV}]$ denotes an average channel calculation procedure.

Figure 11:
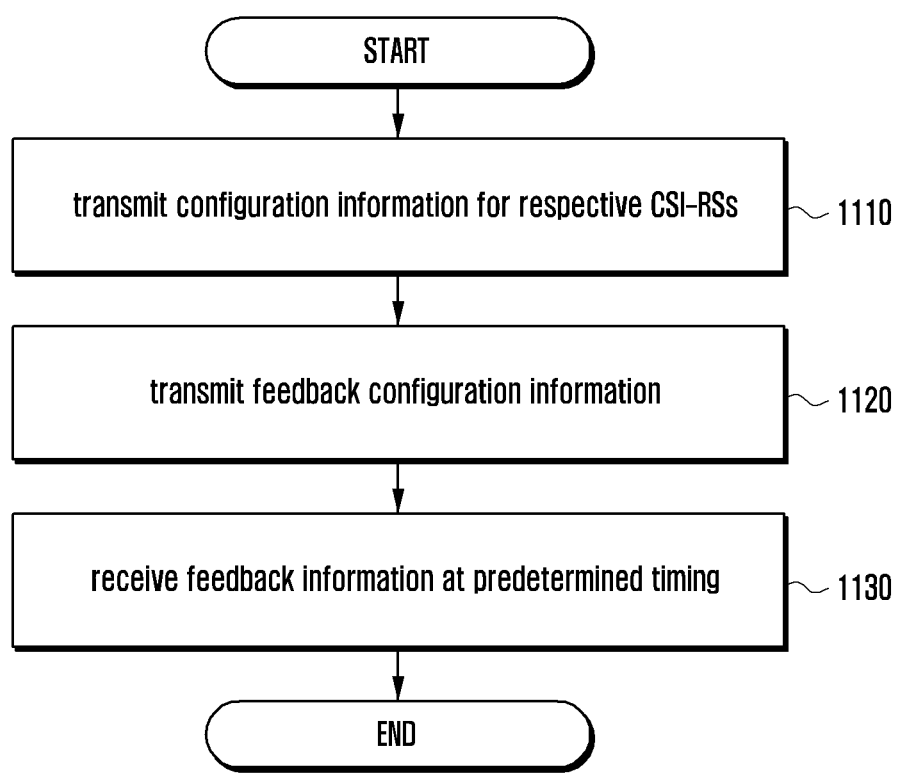
FIG. 11 is a flowchart illustrating an eNB operation procedure according to an embodiment of the present invention.

FIG. 11 is a flowchart illustrating an eNB operation procedure according to an embodiment of the present invention.

Referring to FIG. 11, the eNB sends the UE the two CSI-RS configuration informations for vertical and horizontal direction channel estimations at step 1110. The configuration information may include at least one of the number of CSI-RS ports, per-CSI-RS transmission timing and resource position, progression information, and transmit power information.

Next, the eNB sends the UE feedback configuration information based on two CSI-RSs at step 1120. According to an embodiment of the present invention, the two CSI-RSs feedback configuration information may include part or whole of the RRC information described in table 2.

Next, the eNB sends the UE two CSI-RSs at step 1120 or 1130. The UE estimates channels between the 2-dimensionally arranged $N=N_H N_V$ eNB antennas and $N_{Rx}$ receive antennas. Here, $N_H$ and $N_V$ denotes the respective numbers of vertical and horizontal direction CSI-RS antenna ports.

For example, assuming that the $N_{Rx} \times N_H$ channel matrix estimated based on the CSI-RS-1 is $$H_H = \begin{bmatrix} h_1^{(H)} \\ \vdots \\ h_{N_{Rx}}^{(H)} \end{bmatrix}$$

and the $N_{Rx} \times N_V$ channel matrix estimated based on the CSI-RS-2 is $$H_V = \begin{bmatrix} h_1^{(V)} \\ \vdots \\ h_{N_{Rx}}^{(V)} \end{bmatrix},$$

the $N_{Rx} \times (N_H N_V)$ channel matrix for the 2-dimensional $N=N_H N_V$ transmit antennas can be expressed as equation (17).

The UE estimates channels between the 2-dimensionally arranged $N=N_H N_V$ eNB antennas and $N_{Rx}$ receive antennas. The UE generates the feedback information including RI, PMI i1 and i2, and CQI based on the feedback configuration and the codebook generated according to an embodiment of the present invention. The UE transmits the feedback information at the corresponding feedback timing according to the feedback configuration provided by the eNB.

The eNB receives the feedback information transmitted by the UE at step 1130 and determines the channel state between the UE and the eNB based thereon.

Although the description is directed to the channel virtualization using two or more CSI-RSs, the virtualization may be performed with one CSI-RS. For example, assuming the CSI-RS having 8 logical CSI-RS ports, the CSI-RS PORTs 0~3 may be assumed along with the CSI-RS-1 and the CSI-RS PORTs 4~7 along with the CSI-RS-2 for use of the 4×4 antenna structure.

Although the above embodiments are directed to the channel virtualization based on the CSI-RS, it should be also included in the present invention to virtualize the channel by indicating the reference antenna port for other reference signals such as CRS, PRS, DMRS, and MBSFN RS, according to the standard or through RRC or L1 signaling, as well as CSI-RS. In this case, the reference CSI-RS port may be referred to as reference CRS port, reference PRS port, reference DMRS port, and reference antenna port.

Figure 12:
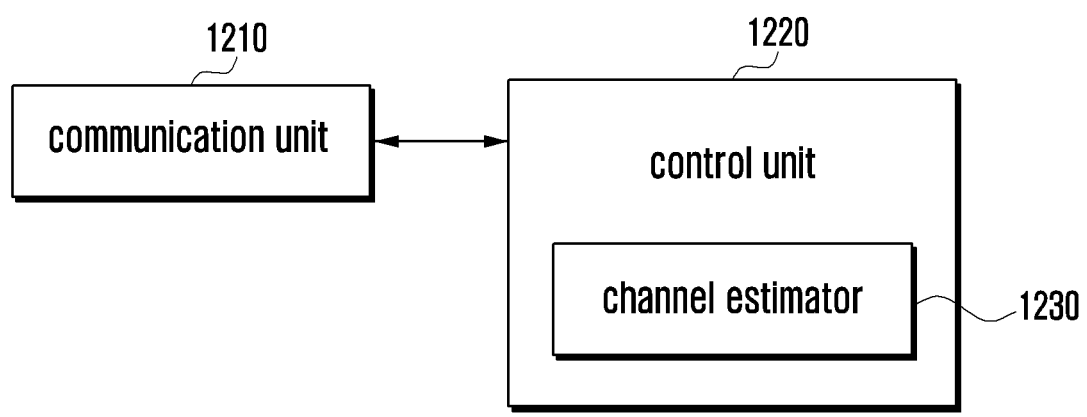
FIG. 12 is a block diagram illustrating a configuration of the UE according to an embodiment of the present invention.

FIG. 12 is a block diagram illustrating a configuration of the UE 1200 according to an embodiment of the present invention.

As shown in FIG. 12 the UE 1200 includes a communication unit 1210 and a control unit 1220.

The communication unit 1210 is adapted to provide for transmitting and receiving data to and from the outside (e.g. eNB). Here, the communication unit 1210 may transmit the feedback information to the eNB for use in the FD-MIMO mode under the control of the control unit 1220.

The control unit 1220 controls the states and operations of the components of the UE 1200. In detail, the control unit 1220 generates the feedback information for FD-MIMO based on the information provided by the eNB. The control unit 1220 controls the communication unit 1210 to transmit the feedback information to the eNB according to the timing information provided by the eNB. For this purpose, the control unit 1220 may include a channel estimator 1230.

The channel estimator 1230 determines feedback information to be reported based on the CSI-RSs and feedback configuration information transmitted by the eNB and estimates channels based on the received CSI-RSs.

Although FIG. 12 is directed to an exemplary case in which the UE 1200 is made up of the communication unit 1210 and the control unit 1220, the present invention is not limited thereto but may be embodied by further including various components necessary for supporting the functions of the UE. For example, the UE may further include a display unit for displaying the operation state of the UE, an input unit for receiving the user input made for executing a certain function, and a storage unit for storing data generated in the UE. Although FIG. 12 is directed to an exemplary case in which the channel estimator 1230 is an independent function block, the present invention is not limited thereto. For example, the control unit 1220 may be configured so as to be adapted to provide the functions of the channel estimator 1230.

In this case, the control unit 1220 may control the communication unit 1210 to receive the configuration information on at least two reference signals from the eNB. The control unit 1220 also may control the communication unit 1210 to receive the feedback configuration information from the eNB for use in measuring the at least two reference signals and generating the feedback information on the basis of the measurement result.

The control unit 1220 measures the at least two reference signals received by the communication unit 1210 and generates the feedback information based on the feedback configuration information. The control unit 1220 controls the communication unit 1210 to transmit the feedback information to the eNB at the feedback timings determined based on the feedback configuration information.

Figure 13:
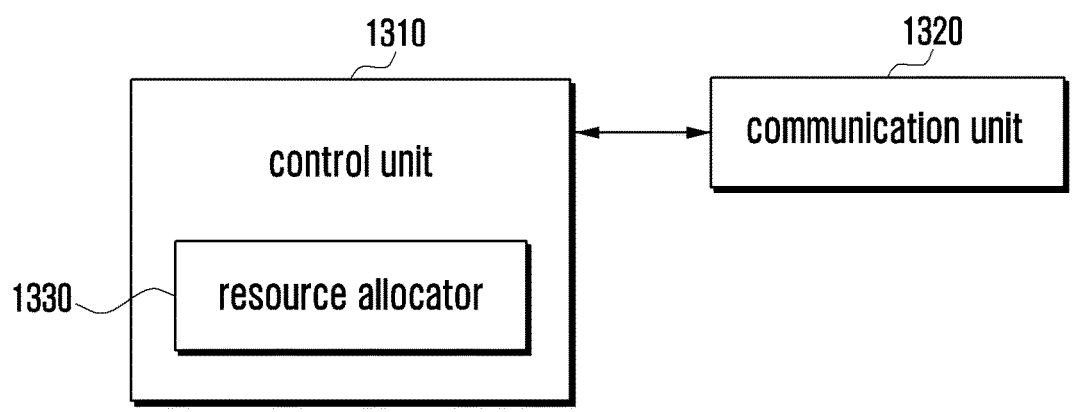
FIG. 13 is a block diagram illustrating a configuration of the eNB according to an embodiment of the present invention.

FIG. 13 is a block diagram illustrating a configuration of the eNB 1300 according to an embodiment of the present invention. As shown in FIG. 13, the eNB 1300 includes a control unit 1310 and a communication unit 1320.

The control unit 1310 controls the states and operations of the components of the eNB 1300. In detail, the control unit 1310 allocates CSI-RS resources for horizontal and vertical component channel estimations to the UE and notifies the UE of the feedback information and feedback timings. For this purpose, the control unit may further include a resource allocator 1330.

The resource allocator 1330 allocates CSI-RS resources in order for the UE to estimate vertical and horizontal component channels and transmit the CSI-RSs using the corresponding resources. The resource allocator 1330 also generates the feedback configuration and feedback timing for the UE to perform feedback without collision and receives and interprets the feedback information at the corresponding timings.

The communication unit 1320 is adapted to provide for transmitting/receiving data, reference signals, and feedback information to/from the UE. Here, the communication unit 1320 transmits the CSI-RSs to the UE using the resource allocated under the control of the control unit 1310 and receives the feedback information on the channels from the UE.

Although FIG. 13 is directed to an exemplary case where the resource allocator 1330 is an independent function block, the present invention is not limited thereto. For example, the control unit 1310 may be configured so as to be adapted to provide the functions of the resource allocator 1330.

In this case, the control unit 1310 may control the communication unit 1320 to transmit the configuration information on at least two reference signals to the UE and measure the at least two reference signals. The control unit 1310 also may control the communication unit 1320 to transmit to the UE the feedback configuration information for use in generating the feedback information based on the measurement result.

The control unit 1310 also may control the communication unit 1320 to transmit the at least two reference signals to the UE and receive the feedback information transmitted by the UE at the feedback timings determined based on the feedback information.

As described above, the feedback method of the present invention is advantageous in terms of preventing the eNB having a plurality of transmit antennas such as FD-MIMO from allocating excessive radio resource for CSI-RS transmission such that the UE is capable of measuring channels associated with the plural transmit antennas and reporting the feedback information generated based on the measurement result to the eNB effectively.

As described above, the channel state information feedback method and apparatus according to embodiments of the present invention is advantageous in terms of preventing the base station having a plurality transmit antennas such as FD-MIMO from allocating excessive radio resource for CSI-RS transmission.

Also, the channel state information feedback method and apparatus of the present invention is advantageous in that the terminal is capable of measuring channels of a plurality of transmit antennas efficiently and reporting the channel state information generated based on the measurement result to the base station efficiently.

Although the apparatus of the present invention has been described schematically above as a single unit, it is obvious to those skilled in the art that the components can be subdivided or integrated into one or more modules, specifically software modules.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the scope of the invention.

The invention claimed is:

1. A feedback transmission method of a terminal in a mobile communication system, the method comprising:
    receiving configuration information for two reference signal (RS) sets;
    receiving feedback configuration information;
    identifying reference antenna port information for the two RS sets;
    receiving two RSs of the two RS sets from a base station;
    estimating a channel between a plurality of antennas of the base station and a plurality of antennas of the terminal based on channels of the received RSs and a relationship between the channels of the received RSs based on a reference antenna port for transmitting both of the received RSs with the same antenna configuration which is indicated by the reference antenna port information; and
    transmitting feedback information on the estimated channel based on the feedback configuration information to the base station,
    wherein the two RS sets are horizontal and vertical direction RSs for the plurality of antennas of the base station being arranged 2-dimensionally,
    wherein a horizontal channel state information reference signal (H-CSI-RS) of the two RSs is used for estimating, by the terminal, a horizontal angle between the plurality of antennas of the terminal and the plurality of antennas of the base station and a vertical channel state information reference signal (V-CSI-RS) of the two RSs is used for estimating, by the terminal, a vertical angle between the plurality of antennas of the terminal and the plurality of antennas of the base station,
    wherein the reference antenna port is an overlapped antenna port between at least one antenna port of a first RS set and at least one antenna port of a second RS set, and
    wherein the feedback information includes at least one of a precoding matrix indicator or a channel quality indicator associated with a codebook for 2-dimensional antenna array.

2. The method of claim 1, wherein the estimating a channel comprises:
    identifying first values to normalize a channel estimated based on the received RSs and a second value to recover amplitudes of the channel estimated based on the received RSs.

3. The method of claim 2, wherein the first values and the second value are determined based on a channel corresponding to the reference antenna port.

4. The method of claim 3, wherein the channel corresponding to the reference antenna port is one of a channel according to the reference antenna port for the first or the second RS sets, an absolute value of the channel according to the reference antenna port of the first or the second RS sets, or a maximum, a minimum, or an average value of the channel according to the reference antenna port for the first and the second RS sets.

5. The method of claim 1, wherein the reference antenna port information is identified based on one of a predetermined rule, information on a Radio Resource Control (RRC) signaling, and information on Layer 1 (L1) signaling between the base station and the terminal.

6. A terminal for transmitting feedback information in a mobile communication system, the terminal comprising:
    a communication unit which is responsible for data communication; and
    a control unit which is configured to:
        control to receive configuration information for two reference signal (RS) sets and feedback configuration information,
        identify reference antenna port information for the two RS sets,
        receive two RSs of the two RS sets from a base station,
        estimate a channel between a plurality of antennas of the base station and a plurality of antennas of the terminal based on channels of the received RSs and a relationship between the channels of the received RSs based on a reference antenna port for transmitting both of the received RSs with the same antenna configuration which is indicated by the reference antenna port information, and
        transmit the feedback information on the estimated channel based on the feedback configuration information to the base station,
    wherein the two RS sets are horizontal and vertical direction RSs for the plurality of antennas of the base station being arranged 2-dimensionally,
    wherein a horizontal channel state information reference signal (H-CSI-RS) of the two RSs is used for estimating, by the terminal, a horizontal angle between the plurality of antennas of the terminal and the plurality of antennas of the base station and a vertical channel state information reference signal (V-CSI-RS) of the two RSs is used for estimating, by the terminal, a vertical angle between the plurality of antennas of the terminal and the plurality of antennas of the base station,
    wherein the reference antenna port is an overlapped antenna port between at least one antenna port of a first RS set and at least one antenna port of a second RS set, and
    wherein the feedback information includes at least one of a precoding matrix indicator or a channel quality indicator associated with a codebook for 2-dimensional antenna array.

7. The terminal of claim 6, wherein the control unit is further configured to identify first values to normalize a channel estimated based on the received RSs and a second value to recover amplitudes of the channel estimated based on the received RSs.

8. The terminal of claim 7, wherein the first values and the second value are determined based on a channel corresponding to the reference antenna port.

9. The terminal of claim 8, wherein the channel corresponding to the reference antenna port is one of a channel according to the reference antenna port for the first or the second RS sets, an absolute value of the channel according to the reference antenna port of the first or the second RS sets, or a maximum, a minimum, or an average value of the channel according to the reference antenna port for the first and the second RS sets.

10. The terminal of claim 6, wherein the control unit is further configured to identify the reference antenna port information based on one of a predetermined rule, information on a Radio Resource Control (RRC) signaling, and information on Layer 1 (L1) signaling between the base station and the terminal.

11. A feedback reception method of a base station in a mobile communication system, the method comprising:
transmitting configuration information for two reference signal (RS) sets;
transmitting feedback configuration information;
transmitting two RSs of the two RS sets to a terminal; and
receiving feedback information on a channel between a plurality of antennas of the base station and a plurality of antennas of the terminal from the terminal,
wherein the feedback information is information on the channel estimated based on channels of the transmitted RSs and a relationship between the channels of the RSs based on a reference antenna port for transmitting both of the RSs with the same antenna configuration which is indicated by reference antenna port information identified by the terminal,
wherein the two RS sets are horizontal and vertical direction RSs for the plurality of antennas of the base station being arranged 2-dimensionally,
wherein a horizontal channel state information reference signal (H-CSI-RS) of the two RSs is used for estimating, by the terminal, a horizontal angle between the plurality of antennas of the terminal and the plurality of antennas of the base station and a vertical channel state information reference signal (V-CSI-RS) of the two RSs is used for estimating, by the terminal, a vertical angle between the plurality of antennas of the terminal and the plurality of antennas of the base station,
wherein the reference antenna port is an overlapped antenna port between at least one antenna port of a first RS set and at least one antenna port of a second RS set, and
wherein the feedback information includes at least one of a precoding matrix indicator or a channel quality indicator associated with a codebook for 2-dimensional antenna array.

12. The method of claim 11, wherein the feedback information is generated based on first values to normalize a channel estimated based on the transmitted RSs and a second value to recover amplitudes of the channel estimated based on the transmitted RSs.

13. The method of claim 12, wherein the first values and the second value are determined based on a channel corresponding to the reference antenna port.

14. The method of claim 13, wherein the channel corresponding to the reference antenna port is one of a channel according to the reference antenna port for the first or the second RS sets, an absolute value of the channel according to the reference antenna port of the first or the second RS sets, or a maximum, a minimum, or an average value of the channel according to the reference antenna port for the first and the second RS sets.

15. The method of claim 11, wherein the reference antenna port information is identified based on one of a predetermined rule, information on a Radio Resource Control (RRC) signaling, and information on Layer 1 (L1) signaling between the base station and the terminal.

16. A base station for receiving feedback information in a mobile communication system, the base station comprising:
a communication unit which is responsible for data communication; and
a control unit which is configured to:
control to transmit configuration information for two reference signal (RS) sets and feedback configuration information, and
transmit two RSs of the two RS sets to a terminal and receive the feedback information on a channel between a plurality of antennas of the base station and a plurality of antennas of the terminal from the terminal,
wherein the feedback information is information on the channel estimated based on channels of the transmitted RSs and a relationship between the channels of the RSs based on a reference antenna port for transmitting both of the RSs with the same antenna configuration which is indicated by reference antenna port information identified by the terminal,
wherein the two RS sets are horizontal and vertical direction RSs for the plurality of antennas of the base station being arranged 2-dimensionally,
wherein a horizontal channel state information reference signal (H-CSI-RS) of the two RSs is used for estimating, by the terminal, a horizontal angle between the plurality of antennas of the terminal and the plurality of antennas of the base station and a vertical channel state information reference signal (V-CSI-RS) of the two RSs is used for estimating, by the terminal, a vertical angle between the plurality of antennas of the terminal and the plurality of antennas of the base station,
wherein the reference antenna port is an overlapped antenna port between at least one antenna port of a first RS set and at least one antenna port of a second RS set, and
wherein the feedback information includes at least one of a precoding matrix indicator or a channel quality indicator associated with a codebook for 2-dimensional antenna array.

17. The base station of claim 16, wherein the feedback information is generated based on first values to normalize a channel estimated based on the transmitted RSs and a second value to recover amplitudes of the channel estimated based on the transmitted RSs.

18. The base station of claim 17, wherein the first values and the second value are determined based on a channel corresponding to the reference antenna port.

19. The base station of claim 18, wherein the channel corresponding to the reference antenna port is one of a channel according to the reference antenna port for the first or the second RS sets, an absolute value of the channel according to the reference antenna port of the first or the second RS sets, or a maximum, a minimum, or an average value of the channel according to the reference antenna port for the first and the second RS sets.

20. The base station of claim 16, wherein the reference antenna port information is identified based on one of a predetermined rule, information on a Radio Resource Control (RRC) signaling, and information on Layer 1 (L1) signaling between the base station and the terminal.

\* \* \* \* \*